United States Patent
Centonza et al.

(10) Patent No.: US 11,910,460 B2
(45) Date of Patent: *Feb. 20, 2024

(54) ASSISTANCE INFORMATION FOR SPCELL SELECTION

(71) Applicant: Telefonaktiebolaget LM Ericsson (publ), Stockholm (SE)

(72) Inventors: Angelo Centonza, Granada (ES); Matteo Fiorani, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,135

(22) Filed: Aug. 3, 2022

(65) Prior Publication Data
US 2022/0377825 A1   Nov. 24, 2022

Related U.S. Application Data

(63) Continuation of application No. 16/963,078, filed as application No. PCT/IB2019/051578 on Feb. 27, 2019, now Pat. No. 11,438,951.
(Continued)

(51) Int. Cl.
*H04W 76/00* (2018.01)
*H04W 76/18* (2018.01)
(Continued)

(52) U.S. Cl.
CPC .......... *H04W 76/18* (2018.02); *H04B 17/318* (2015.01); *H04L 41/0668* (2013.01);
(Continued)

(58) Field of Classification Search
None
See application file for complete search history.

(56) References Cited

U.S. PATENT DOCUMENTS 9,596,701 B2   3/2017  Park et al.
10,568,007 B2 * 2/2020  Park .................. H04W 36/30
(Continued)

FOREIGN PATENT DOCUMENTS

CN    103782638 A    5/2014
RU    2587464 C2     6/2016
(Continued)

OTHER PUBLICATIONS

"(TP for NSA BL CR) Corrections on cell related information", 3GPP TSG RAN WG3 NR #99, Tdoc R3-181371, Athens, Greece, Feb. 26-Mar. 2, 2018, pp. 1-10.
(Continued)

*Primary Examiner* — Gerald A Smarth
(74) *Attorney, Agent, or Firm* — Murphy, Bilak & Homiller, PLLC

(57) ABSTRACT

Exemplary embodiments include methods performed by a central unit, CU, of a base station, for selecting a special cell, SpCell, to be used by a first distributed unit, DU, of the base station for serving a user equipment, UE. Such embodiments can include sending, to the first DU, a first request comprising an identity of a first cell, served by the first DU, as a preferred SpCell for the UE; and identities of one or more second cells served by the first DU. Such embodiments can also include receiving, from the first DU, a first response comprising a first indication that the first DU cannot configure the first cell as an SpCell for the UE, and a second indication that the first DU can configure zero or more third cells as an SpCell for the UE.

19 Claims, 16 Drawing Sheets

Related U.S. Application Data

(60) Provisional application No. 62/636,713, filed on Feb. 28, 2018.

(51) Int. Cl.

| | | |
|---|---|---|
| *H04B 17/318* | (2015.01) | |
| *H04W 76/19* | (2018.01) | |
| *H04W 76/27* | (2018.01) | |
| *H04L 41/0668* | (2022.01) | |
| *H04W 72/21* | (2023.01) | |
| *H04W 88/06* | (2009.01) | |

(52) U.S. Cl.
CPC ........... *H04W 72/21* (2023.01); *H04W 76/19* (2018.02); *H04W 76/27* (2018.02); *H04W 88/06* (2013.01)

(56) References Cited

U.S. PATENT DOCUMENTS

| | | | |
|---|---|---|---|
| 10,798,632 B2* | 10/2020 | Shih | H04W 74/085 |
| 2008/0188215 A1 | 8/2008 | Bergstroem et al. | |
| 2009/0209263 A1 | 8/2009 | Breuer et al. | |
| 2014/0016593 A1 | 1/2014 | Park et al. | |
| 2016/0302106 A1 | 10/2016 | Lei et al. | |
| 2017/0150458 A1 | 5/2017 | Yang et al. | |
| 2017/0215078 A1 | 7/2017 | Mochizuki et al. | |
| 2017/0223762 A1 | 8/2017 | Worrall et al. | |
| 2017/0303289 A1 | 10/2017 | Guo et al. | |
| 2017/0347270 A1 | 11/2017 | Iouchi et al. | |
| 2018/0014218 A1* | 1/2018 | Kubota | H04W 48/00 |
| 2018/0199245 A1 | 7/2018 | Futaki et al. | |
| 2019/0044580 A1* | 2/2019 | Zhou | H04L 5/0051 |

FOREIGN PATENT DOCUMENTS

| | | |
|---|---|---|
| RU | 2638178 C1 | 12/2017 |
| WO | 2014085245 A1 | 6/2014 |
| WO | 2018009362 A2 | 1/2018 |
| WO | 2018017289 A1 | 1/2018 |

OTHER PUBLICATIONS

"(TP for NSA BL CR) PSCell selection", 3GPP TSG-RAN WG3#99, R3-181047, Athens, Greece, Feb. 26-Mar. 2, 2018, pp. 1-4.
"3GPP TS 23.501 V1.5.0", 3rd Generation Partnership Project; Technical Specification Group Services and System Aspects; System Architecture for the 5G System; Stage 2 (Release 15), Nov. 2017, pp. 1-170.
"3GPP TS 38.470 V15.0.0", 3rd Generation Partnership Project; Technical Specification Group Radio Access Network; NG-RAN; F1 general aspects and principles (Release 15), Jan. 2018, pp. 1-11.
"Cells information from gNB-DU to gNB-CU", 3GPP TSG RAN WG3 Meeting #98, Tdoc R3-174783, Reno, Nevada, USA, Nov. 27-Dec. 1, 2017, pp. 1-5.
"Discussion on SCell management in CU-DU deployment", 3GPP TSG RAN WG3#99 Meeting, R3-180899, Athens, Greece, Feb. 26-Mar. 2, 2018, pp. 1-5.
"TP on assistant information for Spcell selection", 3GPP TSG-RAN WG3 Meeting #ADhoc1801, R3-181481, Sophia Antipolis, France, Jan. 22-26, 2018, pp. 1-15.
"UE Reject indication over F1 (for NSA BL CR)", 3GPP TSG RAN3#99, R3-180889, Athens, Greece, Feb. 26-Mar. 2, 2018, pp. 1-4.
"3GPP TS 33.401 V15.10.0", 3rd Generation Partnership Project; Technical Specification Group Services and System Aspects; 3GPP System Architecture Evolution (SAE); Security architecture (Release 15), Dec. 2019, pp. 1-163.
"3GPP TS 36.300 V15.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Dec. 2018, pp. 1-363.
"3GPP TS 38.401 V15.0.0", 3rd Generation Partnership Project; Technical Specification Group Radio Access Network; NG-RAN; Architecture description (Release 15), Dec. 2017, pp. 1-23.
"3GPP TS 38.473 V15.0.0", 3rd Generation Partnership Project; Technical Specification Group Radio Access Network; NG-RAN; F1 application protocol (F1AP); (Release 15), Dec. 2017, pp. 1-90.
"3GPP TS 38.321 V15.0.0", 3rd Generation Partnership Project; Technical Specification Group Radio Access Network; NR; Medium Access Control (MAC) protocol specification (Release 15), Dec. 2017, pp. 1-55.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"Wayforward on assistant information for Spcell selection", 3GPP TSG-RAN WG3 #99 R3-181480 Athens, Greece, Feb. 26-Mar. 2, 2018, 1 page.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| SpCell ID | M | | NR CGI 9.3.1.12 | Special Cell as defined in TS 38.321 [16]. For handover case, this IE shall be considered as target cell. | YES | reject |
| Candidate SpCell List | | 0..1 | | | YES | ignore |
| >Candidate SpCell Item IEs | | 1..<maxnoofCandidateSpCells> | | | EACH | ignore |
| >>Candidate SpCell ID | M | | NR CGI 9.3.1.12 | Special Cell as defined in TS 38.321 [16] | | — |
| SRB to Be Setup List | | 0..1 | | | YES | reject |
| >SRB to Be Setup Item IEs | | 1..<maxnoofSRBs> | | | EACH | reject |
| >>SRB ID | M | | 9.3.1.7 | | | — |
| DRB to Be Setup List | | 0..1 | | | YES | reject |
| >DRB to Be Setup Item IEs | | 1..<maxnoofDRBs> | | | EACH | reject |
| >>DRB ID | M | | 9.3.1.8 | | | — |

FIG. 8

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| Cause | M | | 9.3.1.2 | | YES | ignore |
| Criticality Diagnostics | O | | 9.3.1.3 | | YES | ignore |
| Potential SpCell List | | 0..1 | | | YES | ignore |
| >Potential SpCell Item IEs | | 0..<maxnoofPotentialSpCells> | | | EACH | ignore |
| >>Potential SpCell ID | M | | NR CGI 9.3.1.12 | Special Cell as defined in TS 38.321 [16] | | |

| Range bound | Explanation |
|---|---|
| maxnoofPotentialSpCells | Maximum no. of SpCells allowed towards one UE, the maximum value is 64. |

*FIG. 9*

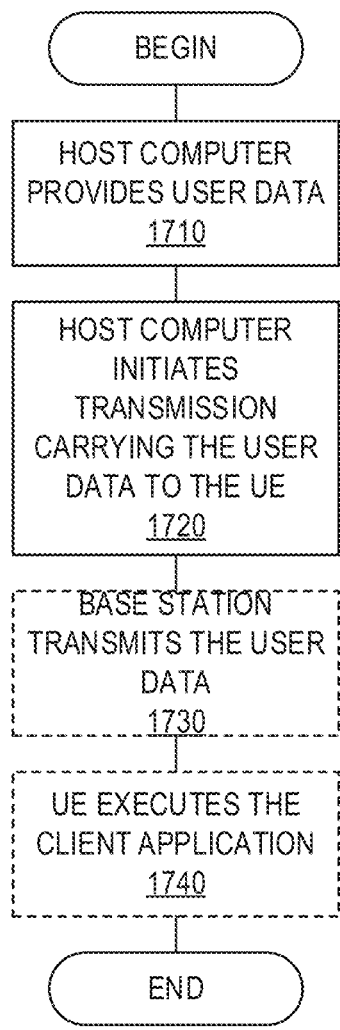
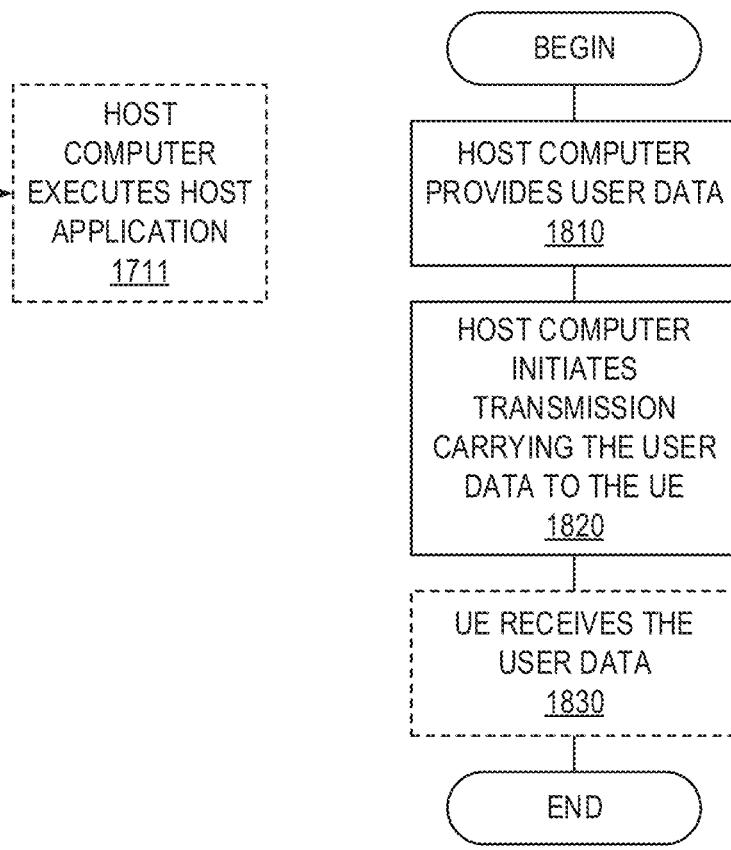
FIG. 17
FIG. 18

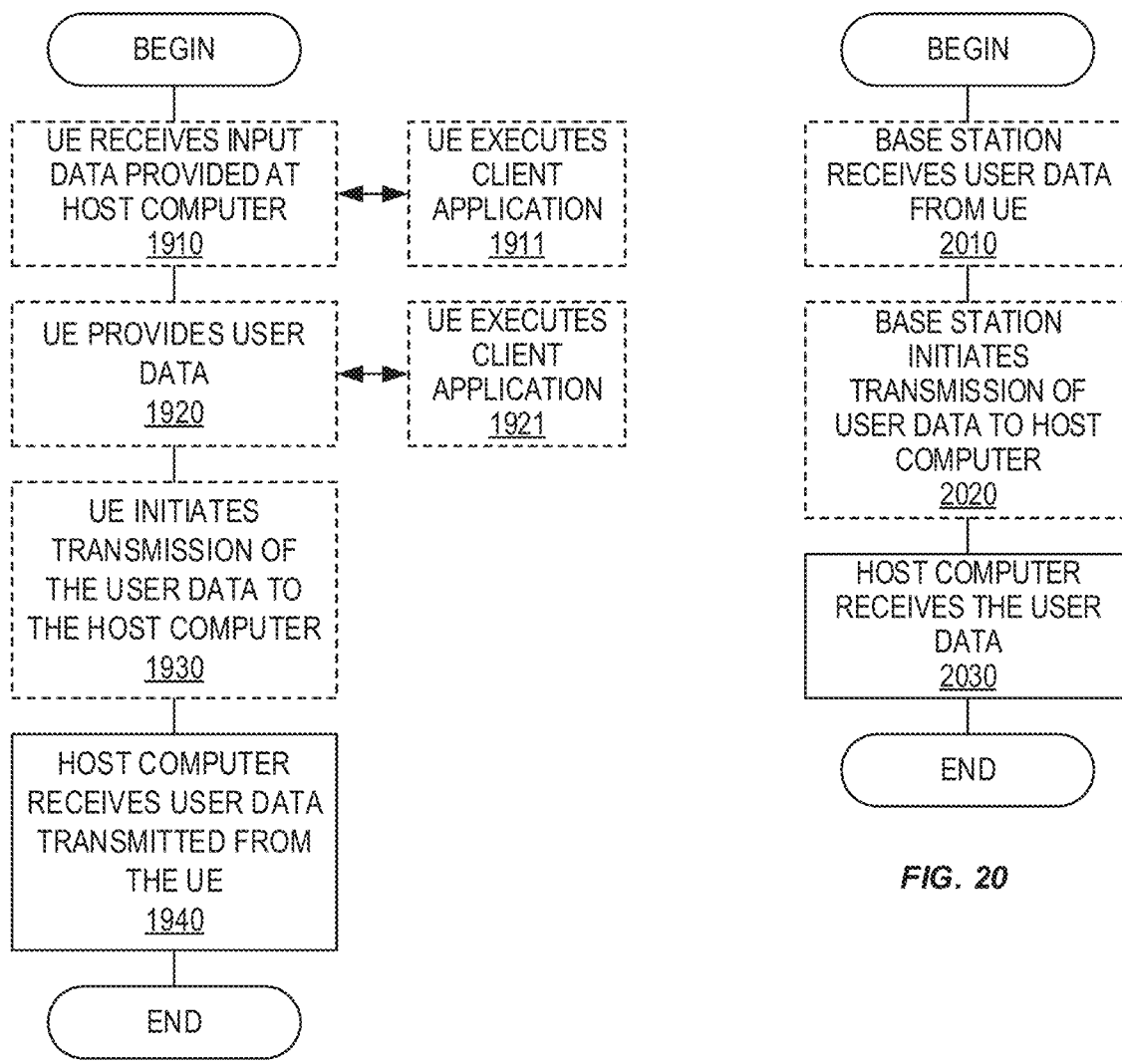

ASSISTANCE INFORMATION FOR SPCELL SELECTION

TECHNICAL FIELD

The present application relates generally to the field of wireless communication systems and methods, and more specifically to devices, methods, and computer-readable media that select special cells (SpCells) for serving a particular wireless device within a split and/or distributed base station architecture.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

Since LTE Release 8, three Signaling Radio Bearers (SRBs), namely SRB0, SRB1 and SRB2 have been available for the transport of Radio Resource Control (RRC) and Non-Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A feature added in LTE Rel-10 (Rel-10) is support for bandwidths larger than 20 MHz, while remaining backward compatible with Rel-8. As such, a wideband LTE Rel-10 carrier (e.g., wider than 20 MHz) should appear as a number of carriers (referred to as "component carriers" or "CCs") to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 terminal can receive multiple CCs, each preferably having the same structure as a Rel-8 carrier.

An example of CA is illustrated in FIG. 1. In this example, base station 100 (e.g., an eNodeB or eNB, for short) provides service or coverage to user equipment (UE, e.g., wireless device), such as UE 102, using three different cells, labelled PCell1, SCell2, and SCell3 in the diagram. The coverage in these cells are provided by three different component carriers CC1, CC2, and CC3, respectively. It should be noted that this configuration is just an illustrative example, and CA configurations using any number of carriers and cells may be employed.

In the context of LTE, a primary cell (PCell, e.g., PCell1) is defined as the "main" cell serving the wireless device such that both data and control signaling can be transmitted over the PCell, while one or more supplementary or secondary cells (SCells, e.g., SCell2 and SCell3) are typically used for transmitting data only, the Scell(s) providing extra bandwidth to enable greater data throughput. A CA-capable UE is assigned a PCell (e.g., PCell1) that is always activated, and one or more SCells (e.g., SCell2 and/or SCell3) which can be activated or deactivated dynamically.

The number of aggregated CCs as well as the bandwidth of individual CCs can be different for uplink and downlink. A "symmetric configuration" refers to the case where the number of CCs in downlink and uplink is the same, whereas an "asymmetric configuration" refers to the case that the number of CCs is different. Furthermore, the number of CCs configured in a cell may be different from the number of CCs seen by a terminal. For example, a terminal can support more downlink CCs than uplink CCs, even though the cell is configured with the same number of uplink and downlink CCs.

A dual connectivity framework has been defined in LTE Rel-12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

The Master Cell Group (MCG) is a group of serving cells associated with the MeNB, comprising a primary cell (PCell) and optionally one or more secondary cells (SCells).

A Secondary Cell Group (SCG) is a group of serving cells associated with the SeNB comprising a Primary SCell (pSCell) and optionally one or more SCells.

The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In a LTE-DC configuration, the MeNB is connected to the SeNBs via the Xn interface, which is currently selected to be the same as the X2 interface between the two eNBs.

According to LTE principles, UEs provide measurement reports—whether in response to an event trigger or a periodic trigger—comprising measurements of serving cell(s). For UE in LTE-DC, serving cell means both cells in MCG (MN) and cell in SCG (SN). For mobility measurement, MeNB configure UE according to various criteria including, e.g., frequency to measure, how to report, etc. Correspondingly, the UE sends measurement results to MeNB once the measurement criteria are met. According to LTE principles, when the UE needs to send a measurement report, whether event- or periodic-triggered, the UE should always send measurement results of serving cell to network. For UE in LTE-DC, serving cell means both cells in MCG (MN) and cell in SCG (SN).

FIG. 2 illustrates various exemplary LTE DC scenarios involving UEs 110 and base stations (eNBs) 120. As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. From the figure, it should also be clear that dual connectivity is a UE-specific feature and that a given network node (or a serving cell) can support a dual-connected UE and a legacy UE at the same time. In other words, MeNB and SeNB are roles played, or functions provided, by eNBs 120 in a particular situation, e.g., with respect to a particular UE. Thus, while the eNBs 120 in FIG. 2 are labeled "MeNB" and "SeNB," this indicates only that they are playing this role for at least one UE 110. Indeed, a given eNB 120 may be an MeNB for one UE 110 while being an SeNB for another UE.

In other words, the master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—to receive data from both nodes and thereby increase its data rate. The MeNB (or MN) provides system information, terminates the CP, and can terminate the UP. An SeNB (or SN), on the other hand, terminates only the UP. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for a fifth-generation (5G) cellular (e.g., wireless) network has recently been completed. 3GPP is now standardizing this new radio interface, often abbreviated by NR (New Radio). FIG. 3 illustrates a high-level view of the 5G network architecture, consisting of a Next Generation RAN (NG-RAN) and a 5G Core (5GC). The NG-RAN can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. With respect the NR interface to UEs, each of the gNBs can support frequency division duplexing (FDD), time division duplexing (TDD), or a combination thereof.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 3 (and described in TS 38.401 and TR 38.801) include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

The gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. Furthermore, the F1 interface between the gNB-CU and gNB-DU is specified, or based on, the following general principles:

F1 is an open interface.

F1 supports the exchange of signaling information between respective endpoints, as well as data transmission to the respective endpoints.

from a logical standpoint, F1 is a point-to-point interface between the endpoints (even in the absence of a physical direct connection between the endpoints).

F1 supports control plane (CP) and user plane (UP) separation, such that a gNB-CU may be separated in CP and UP.

F1 separates Radio Network Layer (RNL) and Transport Network Layer (TNL).

F1 enables exchange of UE-associated information and non-UE associated information.

F1 should be future-proof with respect to new requirements, services, and functions.

A gNB terminates X2, Xn, NG and S1-U interfaces and, for the F1 interface between DU and CU, utilizes the F1 application part protocol (F1-AP) which is defined in 3GPP TS 38.473.

As briefly mentioned above, a CU can host higher-layer protocols such as, e.g., F1-AP, Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. FIG. 4 shows an exemplary gNB architecture based on the DU-CU split and the further separation between CU-CP and CU-UP.

In the gNB split CU-DU architecture illustrated by FIGS. 3-4, DC can be achieved by allowing a UE to connect to multiple DUs served by the same CU or by allowing a UE to connect to multiple DUs served by different CUs. As illustrated by FIG. 3, a gNB can include a gNB-CU connected to one or more gNB-DUs via respective F1 interfaces; however, a gNB-DU can be connected to only a single gNB-CU.

3GPP TR 38.804 describes various exemplary DC scenarios or configurations where the MN and SN are applying either NR, LTE or both. The following terminology is used to describe these exemplary DC scenarios or configurations:

DC: LTE DC (i.e., both MN and SN employ LTE, as discussed above);

EN-DC: LTE-NR dual connectivity where LTE is the master and NR is the secondary;

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and 5GC.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC and NE-DC are two different example cases of MR-DC.

Although the 5G network architecture illustrated by FIGS. 3-4 provides a framework for CA and DC, there exists various issues, drawbacks, and/or challenges associated with the selection and/or configuration of SpCells in the split CU-DU architecture.

SUMMARY

Exemplary embodiments disclosed herein address these and other problems, issues, and/or drawbacks of existing solutions by providing flexible and efficient techniques for selection of SpCells in a distributed (e.g., CU-DU split) base station architecture. Such exemplary embodiments can improve network functionality and/or reliability by reducing the amount of network signaling required.

Exemplary embodiments include methods and/or procedures for selecting a special cell (SpCell) to be used by a first distributed unit (DU) of a base station for serving a user equipment (UE). The exemplary methods and/or procedures can be performed by a central unit (CU) or node of a base station (e.g., a gNB-CU) in communication with one or more distributed units (DUs, e.g., gNB-DUs) of the base station.

In some embodiments, the exemplary methods and/or procedures can include receiving radio signal measurements relating to a plurality of cells associated with one or more DUs including a first DU and, in some cases, a second DU. In some embodiments, the exemplary methods and/or procedures can also include selecting, from the plurality of cells based on the radio signal measurements, a first cell as a preferred SpCell for a UE and one or more second cells as alternate SpCells for the UE. Both the first cell and the one or more second cells can be served by the first DU.

The exemplary methods and/or procedure can also include sending, to the first DU, a first request comprising:

an identity of the first cell as a preferred SpCell for the UE; and identities of the one or more second cells. In some embodiments, the one or more second cells can comprise one of the following: candidate SpCells for the UE, and candidate secondary cells (SCells) for the UE. The exemplary methods and/or procedures can also include receiving, from the first DU, a first response comprising: a first indication that the first DU cannot configure the first cell as an SpCell for the UE; and a second indication that the first DU can configure zero or more third cells as an SpCell for the UE. In some embodiments, the second indication comprises at least one of the following: an indication that the first DU cannot configure any of the second cells as an SpCell for the UE; and identities of the third cells, each of the identified third cells being one of the second cells.

In some embodiments, the exemplary methods and/or procedures can also include selecting a further first cell and one or more further second cells, served by a second DU, from the plurality of cells based on the radio signal measurements. Such embodiments can also include sending, to the second DU, a second request comprising an identity of the further first cell (e.g., as a preferred SpCell for the UE) and identities of the further second cells. Such embodiments can also include receiving, from the second DU, a second response comprising: a further first indication that the second DU cannot configure the further first cell as an SpCell for the UE; and a further second indication that the second DU can configure zero or more further third cells as an SpCell for the UE.

Other exemplary embodiments include methods and/or procedures for selecting a special cell (SpCell) to be used for serving a user equipment (UE). These exemplary methods and/or procedures can be performed by a distributed unit (DU) or node of a base station (e.g., gNB-DU) connected to a central unit (CU) or node (e.g., gNB-DU) of the base station.

The exemplary methods and/or procedures can include receiving, from the CU, a first request comprising: an identity of the first cell, served by the DU, as a preferred SpCell for the UE; and identities of the one or more second cells served by the DU. In some embodiments, the one or more second cells can comprise one of the following: candidate SpCells for the UE, and candidate secondary cells (SCells) for the UE.

The exemplary methods and/or procedures can also include determining whether any of the first cell and the second cells can be configured as an SpCell for the UE. In some embodiments, the DU can make this determination based on one or more DU operating conditions, including any of the following: DU load conditions; availability of DU resources associated with the respective third cells; and location of the UE within DU coverage areas associated with the respective third cells.

The exemplary methods and/or procedures can also include sending, to the CU, a first response comprising: a first indication that the DU cannot configure the first cell as an SpCell for the UE; and a second indication that the DU can configure zero or more third cells as an SpCell for the UE. In some embodiments, the second indication comprises at least one of the following: an indication that the DU cannot configure any of the second cells as an SpCell for the UE; and identities of the third cells, wherein each of the identified third cells is one of the second cells. In some embodiments, the exemplary methods and/or procedures can also include receiving, from the CU, a second request comprising an identity of one of the third cells as a preferred SpCell for the UE.

Other exemplary embodiments include base station central and distributed units and/or nodes (e.g., gNB-CUs, gNB-DUs, etc.) adapted and/or configured to perform operations corresponding to exemplary methods and/or procedures described herein. Other exemplary embodiments include non-transitory, computer-readable media storing program instructions that, when executed by at least one processor, configure such bae station units and/or nodes to perform operations corresponding to exemplary methods and/or procedures described herein.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 7, which includes

FIG. 8 shows portions of an exemplary F1-AP message from a gNB-CU to a gNB-DU, according to various exemplary embodiments of the present disclosure.

FIG. 9 shows portions of an exemplary F1-AP message from a gNB-DU to a gNB-CU, according to various exemplary embodiments of the present disclosure.

FIGS. 17-20 are flow diagrams illustrating various exemplary methods and/or procedures implemented in a communication system, according to various exemplary embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node (s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 1:
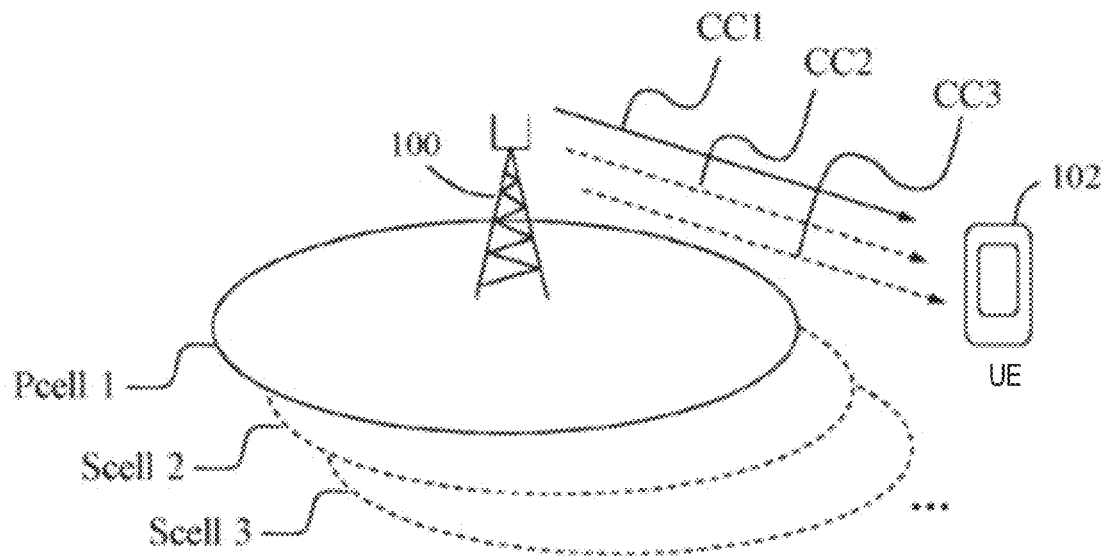
FIG. 1 is a high-level network diagram illustrating an exemplary Long-Term Evolution (LTE) carrier aggregation (CA) scenario involving various cells provided by base station (e.g., eNB) to a user equipment (UE).
Figure 2:
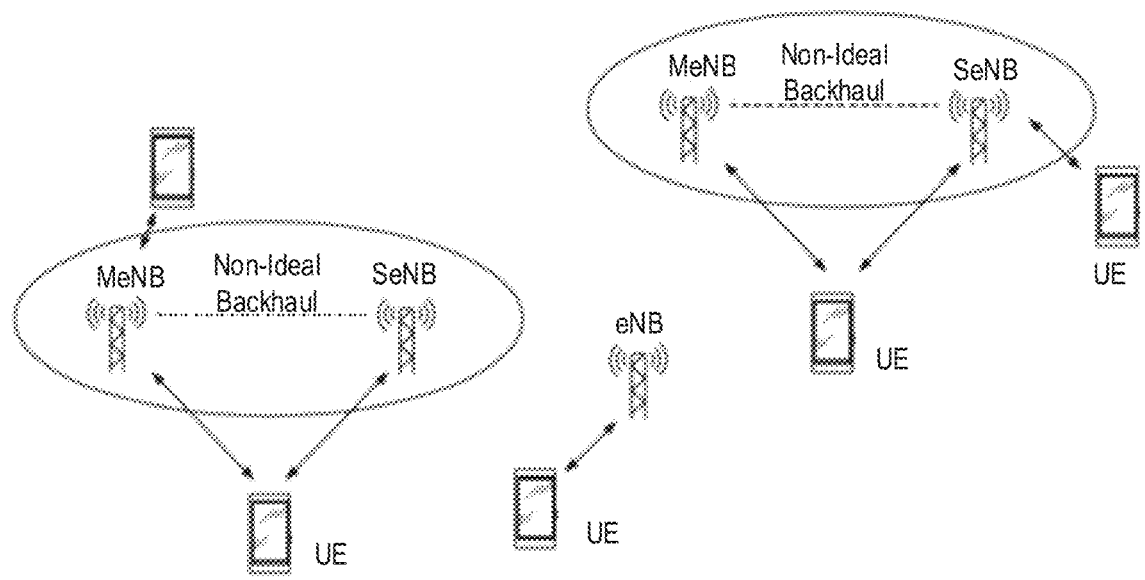
FIG. 2 is a high-level network diagram illustrating various exemplary LTE dual connectivity (DC) scenarios involving user equipment (UEs) and base stations (eNBs).
Figure 3:
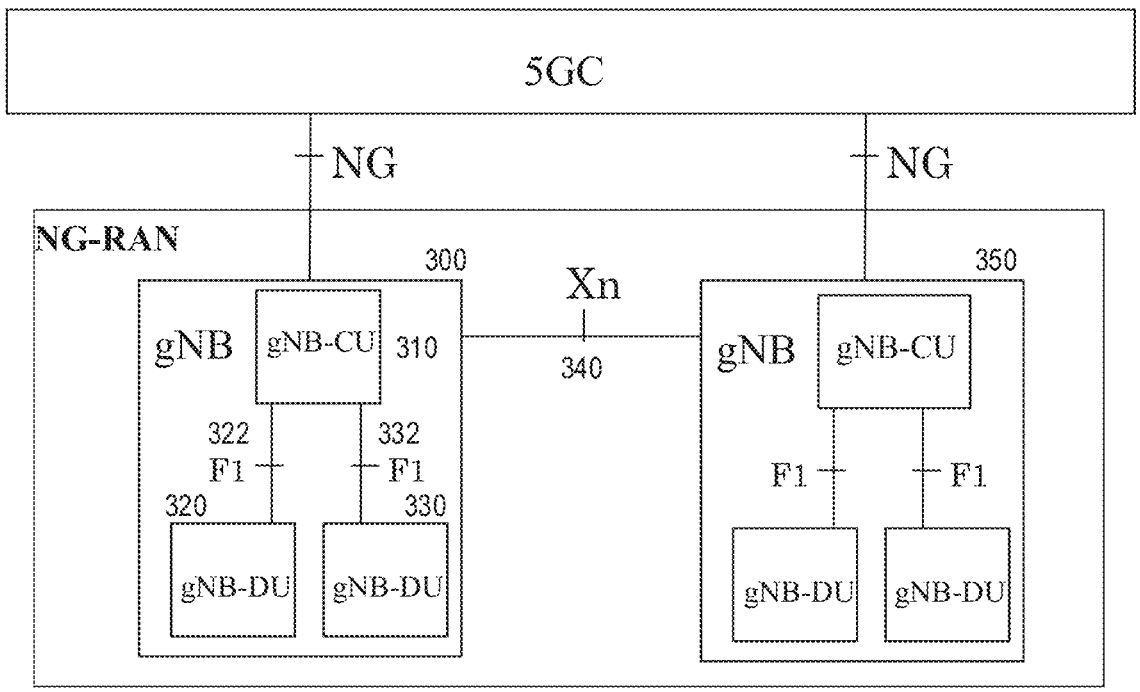
FIG. 3 illustrates a high-level view of a fifth-generation (5G) cellular (e.g., wireless) network architecture.
Figure 4:
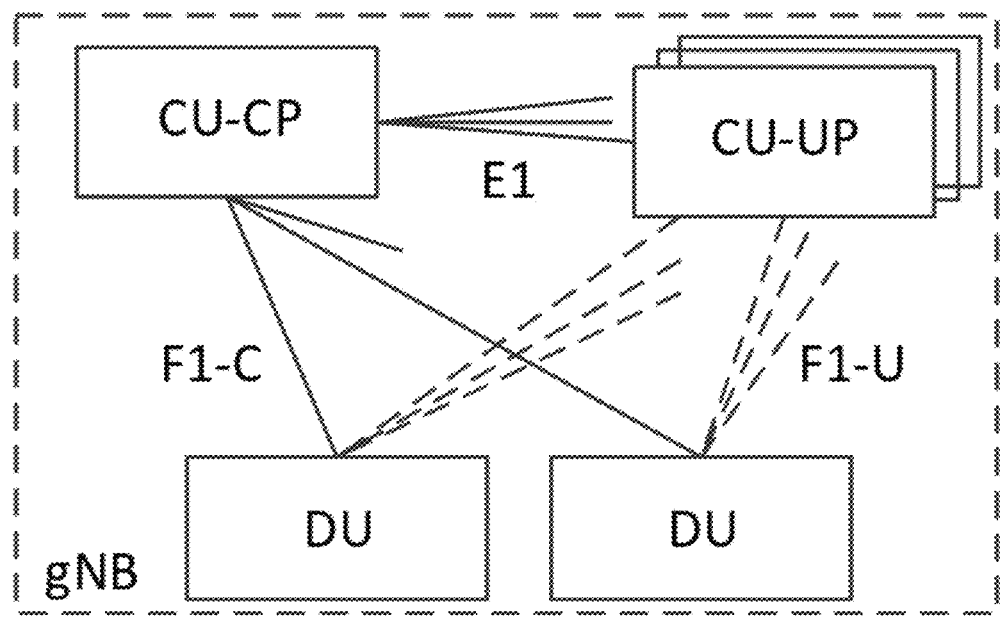
FIG. 4 shows an exemplary gNB architecture based on the DU-CU split and the further separation between CU-CP and CU-UP.

As mentioned above, although the 5G network architecture illustrated by FIGS. 3-4 provides a framework for CA and DC, there exists various issues, drawbacks, and/or challenges associated with the selection and/or configuration of SpCells in the split CU-DU architecture. These issues are discussed in more detail below.

As mentioned above, an SpCell is always activated and that supports physical uplink control channel (PUCCH) transmission and contention-based Random Access by UEs. Given these important SpCell functions and capabilities, it is important for the network to select and configure an appropriate SpCell for each UE that establishes a connection with the network. This selection can be based on, e.g., radio measurements made by the respective UEs and provided to the network. Furthermore, due to UE mobility and/or change in radio conditions, it will often be necessary for the network to select and configure different SpCells for a particular UE over the duration of a connection.

With respect to 5G networks, the current F1-AP specifications (e.g., 3GPP TS 38.470 and TS 38.473) place responsibility for selecting a SpCell on the gNB-CU in the split CU-DU architecture. A reason for this requirement is that only the gNB-CU receives the measurement reports from the UE and has knowledge about the radio link quality on different cells.

Figure 5:
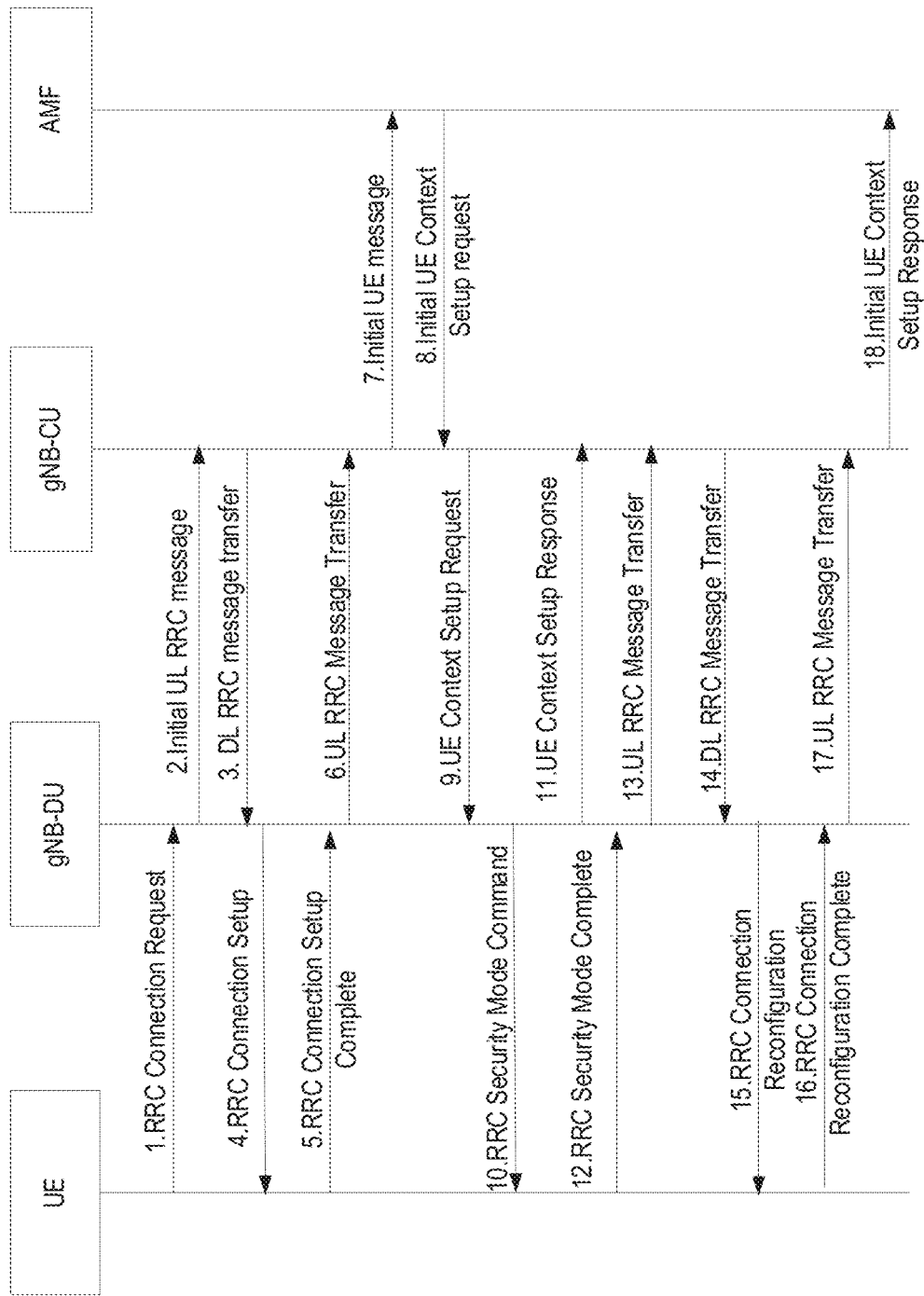
FIG. 5 illustrates an exemplary initial UE access procedure during which a gNB-CU can select and configure an appropriate SpCell for a UE.

FIG. 5 illustrates an exemplary initial UE access procedure during which the gNB-CU selects and configures an appropriate SpCell for the UE. In FIG. 5, the operations are numerically labelled to facilitate explanation and understanding. In other words, any limitation and/or restriction on the order of these operations will be described explicitly, and should not be inferred by the numerical order in the figure.

In operation 1, the UE sends an RRC Connection Request message to the gNB-DU. This can occur, for example, after an initial portion of a random-access (RA) procedure has been completed. In operation 2, the gNB-DU can determine if it can admit the UE for service and, if admitted, the gNB-DU includes the RRC message and the corresponding low layer configuration for the UE in the F1AP INITIAL UL RRC MESSAGE TRANSFER message that it sends to the associated gNB-CU. The INITIAL UL RRC MESSAGE TRANSFER message can also include a temporary identity (e.g., C-RNTI) allocated by the gNB-DU to the UE. Note that the gNB-DU forwards the RRC message because the gNB-CU terminates the RRC (e.g., CP) connection with the UE.

In operation 3, after receiving the RRC Connection Request message, the gNB-CU allocates a signaling connection ID (e.g., gNB-CU UE F1AP ID) for the UE and generates an RRC Connection Setup message towards UE. This RRC message is encapsulated in the F1-AP DL RRC MESSAGE TRANSFER message that the gNB-CU sends to the gNB-DU.

In operation 4, the gNB-DU decapsulates the RRC Connection Setup message and sends it to the UE. In operation 5, the UE performs operations associated with the RRC Connection Setup message and sends a RRC Connection Setup Complete message to the gNB-DU. In operation 6, the gNB-DU encapsulates this RRC Connection Setup Complete message in an F1-AP UL RRC MESSAGE TRANSFER message that the gNB-DU sends to the gNB-CU.

In operation 7, the gNB-CU sends an INITIAL UE MESSAGE message (comprising, e.g., parameters associated with the UE) to the Access Management Function (AMF), which responds in operation 8 with an INITIAL UE CONTEXT SETUP REQUEST message. In operation 9, the gNB-CU sends an F1-AP UE Context Setup Request message to establish the UE context in the gNB-DU. The F1-AP UE Context Setup Request message can include various UE parameters received from the AMF, as well as an identity of the SpCell that the gNB-CU has selected for the UE.

Figure 7A:
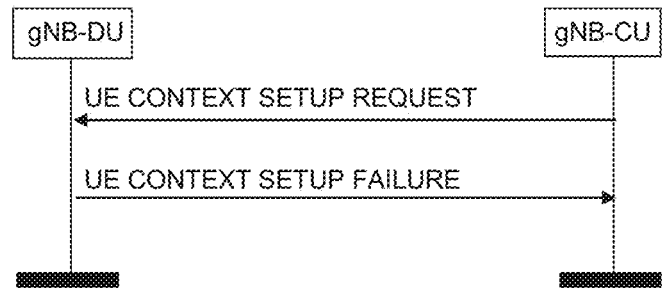
FIGS. 7A-C, illustrates signaling between a gNB-CU and a gNB-DU related to UE context setup or modification, according to various exemplary embodiments of the present disclosure.

Based on its load conditions or other factors, the gNB-DU can either accept or reject the SpCell selected by the gNB-CU. If the gNB-DU accepts the selected SpCell, it can respond with an F1-AP UE Context Setup Response message, as shown in FIG. 5. On the other hand, if the gNB-DU rejects the selected SpCell, then it can reply to the gNB-CU with an F1-AP UE Context Setup Failure message containing an appropriate cause value. FIG. 7(a) shows exemplary signaling between gNB-CU and gNB-DU in relation to a rejected SpCell selection.

Figure 6:
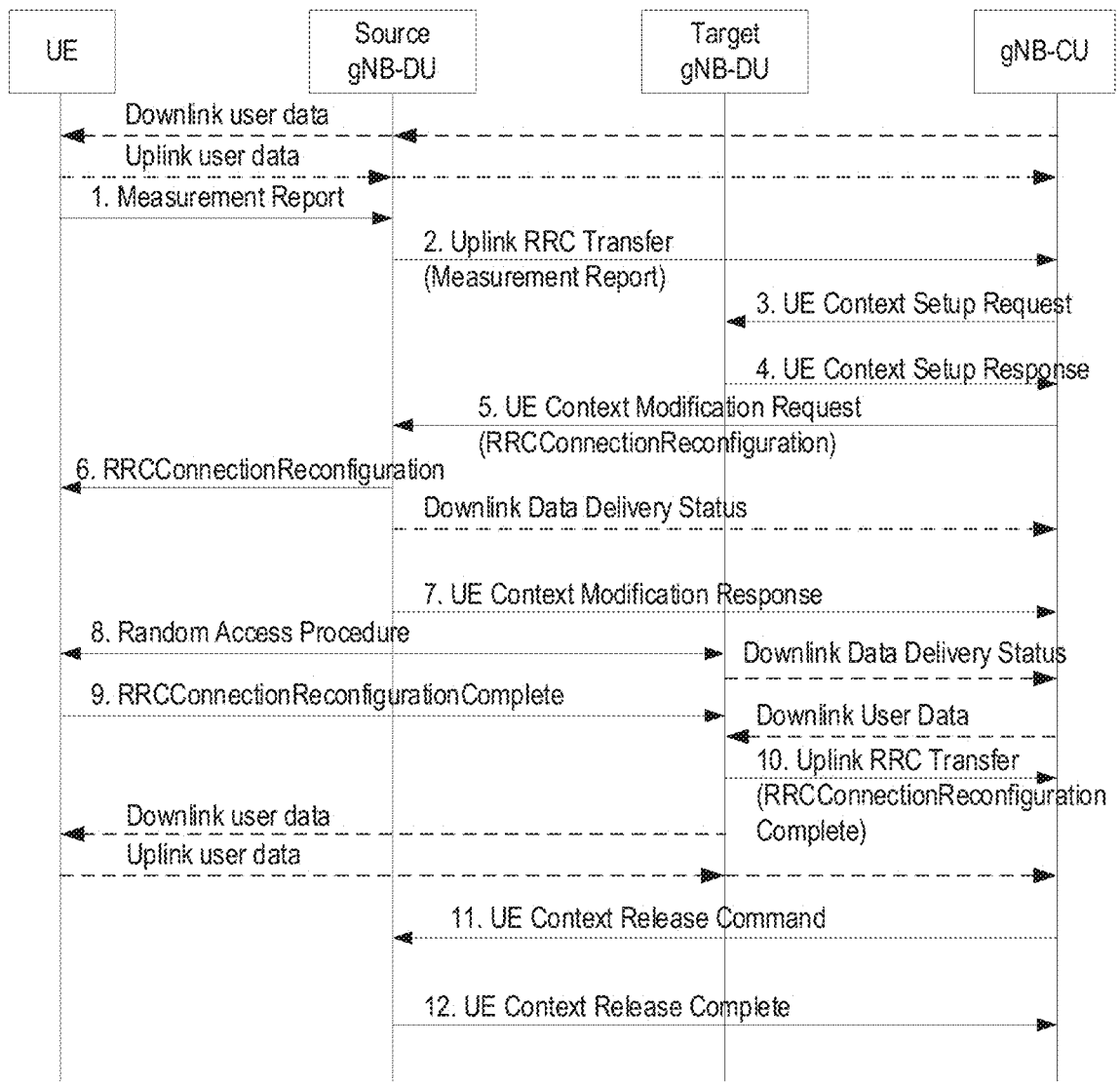
FIG. 6 illustrates an exemplary inter-gNB-DU mobility procedure during which a gNB-CU can select and configure an appropriate SpCell for a UE.

FIG. 6 illustrates an exemplary inter-gNB-DU mobility procedure during which the gNB-CU also selects and configures an appropriate SpCell for the UE. In FIG. 6, the operations are numerically labelled to facilitate explanation and understanding. In other words, any limitation and/or restriction on the order of these operations will be described explicitly, and should not be inferred by the numerical order in the figure.

In FIG. 6, the gNB-CU is assumed to be connected to two gNB-DUs: a source gNB-DU and a target gNB-DU. The UE initially utilizes an SpCell provided by the source gNB-DU. In operation 1, the UE sends an RRC Measurement Report message to the source gNB-DU. This message can include various radio signal measurements related to various cells in proximity with the UE, including cells provided by the source gNB-DU (including the UE's SpCell), cells provided by the target gNB-DU, and/or cells provided by other DUs and/or gNBs.

In operation 2, the source gNB-DU sends an F1-AP UL RRC MESSAGE TRANSFER message to the gNB-CU to convey the received RRC Measurement Report. Note that the gNB-DU forwards the RRC message because the gNB-CU terminates the RRC (e.g., CP) connection with the UE. However, the gNB-DU may also receive various lower-layer (e.g., MAC) measurements from the UE, and since the gNB-DU terminates these lower-layer connections with the UE, the gNB-DU does not forward the corresponding lower-layer measurements to the gNB-CU. In general, these lower-layer measurements can be performed more frequently than measurements reported by RRC Measurement Report, such that the gNB-DU can have a more accurate and/or more recent view of the connection with the UE than the gNB-CU.

Based on the measurements in the received Measurement Report (and, optionally, in one or more previously-received Measurement Report messages), the gNB-CU can determine to perform a mobility operation (e.g., handover) of the UE from the source gNB-DU to the target gNB-DU. This can include, for example, a selection of a cell provided by the target gNB-DU as a new SpCell for the UE.

In operation 3, the gNB-CU sends an F1-AP UE Context Setup Request message to establish the UE context in the target gNB-DU. The F1-AP UE Context Setup Request message can include various UE parameters including the identity of the SpCell that the gNB-CU has selected for the UE. If the target gNB-DU accepts the selected SpCell, it can respond with an F1-AP UE Context Setup Response message, as shown in FIG. 6. On the other hand, if the target gNB-DU rejects the selected SpCell, then it can reply to the gNB-CU with an F1-AP UE Context Setup Failure message containing an appropriate cause value, such as shown in FIG. 7(A).

In both of the scenarios shown in FIGS. 5-6, upon receiving a F1-AP UE Context Setup Failure message with an appropriate cause value, the gNB-CU can select a different SpCell and inform the gNB-DU with another F1-AP UE Context Setup Request message. However, the gNB-CU has no detailed information about the load in the gNB-DU, so there is a risk that the new SpCell selected by the gNB-CU will also be rejected. This can lead to many failures before a suitable SpCell can be selected.

In another scenario, SpCell selection and configuration can be used in an intra-gNB-DU mobility procedure similar to the inter-gNB-DU mobility procedure shown in FIG. 6. In such scenarios, the "target gNB-DU" and "source gNB-DU" shown in FIG. 6 become a single gNB-DU. Based on the measurements in a received Measurement Report (and, optionally, in one or more previously-received Measurement Report messages), the gNB-CU can determine to perform a mobility operation (e.g., handover) of the UE between cells provided by the gNB-DU. This can include, for example, a selection of a different cell provided by the gNB-DU as a new SpCell for the UE.

Figure 7B:
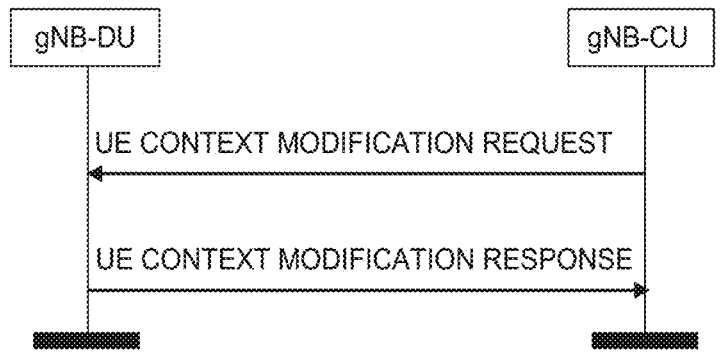

In such case, the gNB-CU sends an F1-AP UE Context Modification Request message to the gNB-DU. The F1-AP UE Context Modification Request message can include various UE parameters including the identity of the SpCell that the gNB-CU has selected for the UE. If the gNB-DU accepts the modified SpCell, it can respond with an F1-AP UE Context Modification Response message, such as shown in FIG. 7(B). On the other hand, if the target gNB-DU rejects the selected SpCell, then it can reply to the gNB-CU with an F1-AP UE Context Modification Failure message containing an appropriate cause value, such as shown in FIG. 7(B).

Similar to the scenarios illustrated in FIGS. 5-6, upon receiving a F1-AP UE Context Modification Failure message with a corresponding cause value, the gNB-CU can select a different SpCell and inform the gNB-DU with another F1-AP UE Context Modification Request message. However, the gNB-CU has no detailed information about the load in the gNB-DU, so there is a risk that the new SpCell selected by the gNB-CU will also be rejected. This may lead to many failures before a new SpCell can be selected during intra-DU mobility operations.

Exemplary embodiments of the present disclosure address these and other problems and/or shortcomings of prior solutions by a novel technique whereby a gNB-CU can provide to a gNB-DU (e.g., via F1-AP UE Context Setup Request message) an indication and/or identity of mandatory and/or preferred SpCell that the CU has selected for the UE connecting via the corresponding gNB-DU. In addition, the gNB-CU can provide a Candidate SpCells list. If the gNB-DU cannot accept the preferred SpCell (e.g., because the selected SpCell is subject to overload or shortage of resources to serve the specific UE), then the gNB-DU can respond with a message (e.g., F1AP UE Context Setup Failure) that includes a Potential SpCells list that can be setup for the UE. The cells in the Potential SpCells list can be among the cells included in the Candidate SpCells list. For example, the list of SpCells included in the message sent by the gNB-DU can represent the cells of the Candidate SpCells list for which the gNB-DU can admit and allocate sufficient resources to serve the UE.

In other embodiments, a gNB-CU can provide to a gNB-DU (e.g., via F1-AP UE Context Setup Request message) an indication and/or identity of a mandatory and/or preferred SpCell that the CU has selected for the UE connecting via the corresponding gNB-DU. In addition, the gNB-CU can provide a Candidate SCells list for carrier aggregation (CA). If the gNB-DU cannot accept the preferred SpCell (e.g., because the SpCell is subject to overload or shortage of resources to serve the specific UE), then the gNB-DU can respond with a message (e.g., F1AP UE Context Setup Failure) that includes a Potential SpCells list of cells that can be setup for the UE. The cells included in the Potential SpCells list can be among the cells included in the Candidate SCells list. For example, the list of SpCells included in the message sent by the gNB-DU can represent the cells within the Candidate SCells list for which the gNB-DU can admit and allocate sufficient resources to serve the UE.

Exemplary embodiments can improve network functionality and/or reliability by reducing the likelihood that a UE Context Setup or a UE Context Modification procedure will fail due to one or more selected SpCells being unacceptable to a gNB-DU. Exemplary embodiments also reduce the required DU-CU signaling capacity by facilitating selection of an acceptable SpCell with fewer messages exchanged between DU and CU, thereby making network operation faster and more efficient. Additional technical advantages may be readily apparent in light of the disclosure herein.

Figure 7C:
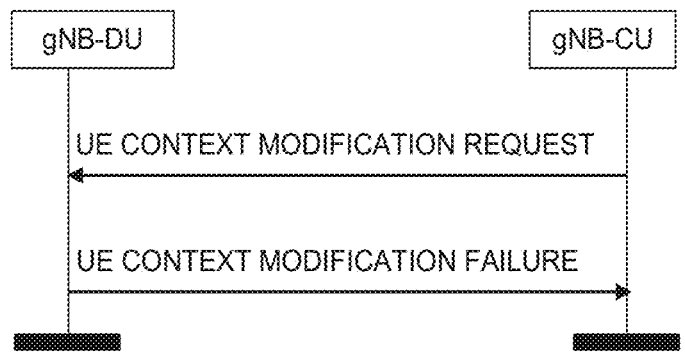

FIG. 8 shows portions of an exemplary F1-AP message from a gNB-CU to a gNB-DU, according to various exemplary embodiments of the present disclosure. For example, the message portion shown in FIG. 8 can be part of an F1-AP UE Context Setup Request message or an F1-AP UE Context Modification Request message, such as shown in FIGS. 5-7 and discussed above. In other words, the message fields shown in FIG. 8 can be combined with other message fields, as needed and/or desired, to form a complete F1-AP UE Context Setup Request message or F1-AP UE Context Modification Request message.

The fields shown in FIG. 8 include an SpCell ID, which can indicate and/or identify a particular cell, associated with the gNB-DU, that was selected by the gNB-CU as the preferred SpCell for the UE. For example, this parameter can be represented as the cell global identity (CGI) of the selected/preferred cell. In addition, the fields shown in FIG. 8 include a Candidate SpCell List, which can include a plurality of identifiers (e.g., CGIs) corresponding to cells—also associated with the gNB-DU—that the gNB-CU has selected as alternate (e.g., acceptable but non-preferred) candidates for the UE's SpCell. These selected alternate cells can be arranged in any order in the Candidate SpCell List such as, e.g., most preferred (after the identified preferred SpCell) to least preferred according to various criteria including, e.g., radio signal measurements of the respective cells, loading of the respective cells, etc. The Candidate SpCell List can include any number of cells up to and including a maximum number (e.g., maxnoofCandidateSpCells in FIG. 8).

In some embodiments, instead of a Candidate SpCell List such as shown in FIG. 8, the message portion can comprise a Candidate SCell List that identifies a list of Candidate SCells associated with the gNB-DU that the gNB-CU selected for carrier aggregation (CA) with the selected/preferred SpCell. In addition, however, the cells comprising the Candidate SCell List are also alternate (e.g., acceptable but non-preferred) candidates for the UE's SpCell. The cells comprising Candidate SCell List can be identified in a similar manner as the cells comprising the Candidate SpCell List (e.g., by CGI). These selected alternate cells can be arranged in any order in the Candidate SCell List such as, e.g., most preferred (after the identified preferred SpCell) to least preferred according to various criteria including, e.g., radio signal measurements of the respective cells, loading of the respective cells, etc. The Candidate SCell List can include any number of cells up to and including a maximum number (e.g., maxnoofCandidateSCells).

In some embodiments, the fields comprising the message portion shown in FIG. 8 can also include one or more lists of radio bearers requested to be setup for the UE. This can include a list of signaling radio bearers (SRBs) and/or a list of data radio bearers (DRBs). The radio bearers comprising the respective lists can be identified by an appropriate identifier that is understood by both gNB-CU and gNB-DU. In some embodiments, additional characteristics and/or requirements (e.g., QoS) can be included for each radio bearer comprising the respective lists. When one or both of such lists are present, the receiving gNB-DU can use the radio-bearer characteristics and/or requirements in making an admission decision for the UE in the selected/preferred SpCell and, if not admitted, in determining whether any of the other cells on the Candidate SpCell List (or Candidate SCell List) are acceptable UE SpCell alternatives.

Upon receiving the request (e.g., F1-AP UE Context Setup Request) from the gNB-CU comprising the SpCell ID and the Candidate SpCell List (or Candidate SCell List), the gNB-DU can perform this admission decision, first with respect to the cell identified by the SpCell ID and second, if necessary, with respect to the cells identified on the received candidate list. Some or all of these admission decisions and/or determinations can involve comparing the resources needed by the UE (e.g., for the UE's radio bearers identified in the message) to the amount of resources available and/or the loading conditions in the particular cell. In some embodiments, some or all of these admission decisions and/or determinations can involve determining whether the UE is located in a coverage area associated with the particular cell.

For example, the gNB-DU can determine that the preferred SpCell for the UE (i.e., the cell identified by SpCell ID) cannot be configured as an SpCell for the UE due to a lack of resources for serving the UE and/or a lack of coverage of the UE. In such case, the gNB-DU can determine whether any of the alternate SpCell candidates, identified in the received list, can be configured as an SpCell for the UE. In some embodiments, the determination for each of these SpCell candidates can be performed in the same manner as for the preferred SpCell.

After making these determinations and/or admission decisions, the gNB-DU can send a response to the gNB-CU indicating a UE context setup failure due to inability to admit the UE in the preferred SpCell. FIG. 9 shows portions of an exemplary F1-AP message from a gNB-DU to a gNB-CU, according to various exemplary embodiments of the present disclosure. For example, the message portion shown in FIG. 9 can be part of an F1-AP UE Context Setup Failure message or an F1-AP UE Context Modification Failure message, such as shown in FIG. 7 and discussed above. In other words, the message fields shown in FIG. 9 can be combined with other message fields, as needed and/or desired, to form a complete F1-AP UE Context Setup Failure message or F1-AP UE Context Modification Failure message.

The fields shown in FIG. 9 include a Cause, which can indicate and/or identify a particular cause or reason why the gNB-DU could not perform the requested UE context setup or modification. The Cause field can include one of a plurality of numerical values, each value associated with a particular reason for failure. For example, a particular numerical value can be used indicate a lack of available resources in the preferred SpCell to meet the UE's requirements. Likewise, a different numerical value can be used to indicate that the UE is outside of the preferred SpCell's coverage area.

In addition, the fields shown in FIG. 9 include a Potential SpCell List. This list can include identifiers for any cells in the Candidate SpCell List (or Candidate SCell List) that the gNB-DU determined could be configured as an SpCell for the UE. In other words, the cells identified in Potential SpCell List are those in which the UE can be admitted according to its requirements and respective cell operating conditions (e.g., load, capacity, coverage, etc.). The cells in Potential SpCell List can be identified in the same manner as in the Candidate SpCell List (or Candidate SCell List), e.g., by CGI.

The cells identified in the Potential SpCell List can be arranged in any order such as, e.g., most preferred to least preferred according to various gNB-DU operating conditions of the respective cells including, e.g., measurements of the respective cells, loading of the respective cells, UE coverage of the respective cells, etc. The Potential SpCell List can include any number of cells up to and including a maximum number (e.g., maxnoofPotentialSpCells), which can be less than or equal to the maximum number associated with the Candidate SpCell List (or Candidate SCell List). In some embodiments, if the none of the alternate candidate SpCells are acceptable to the gNB-DU, the Potential SpCell List can be empty.

Upon receiving the message comprising the Potential SpCell List, the gNB-CU can evaluate the cells identified by this list against the gNB-CU's own knowledge of radio signal conditions in those respective cells. For example, these radio signal conditions can be determined by the gNB-CU based on measurements received in one or more RRC Measurement Report messages from one or more UEs, including the particular UE. In some embodiments, if the cells in the Potential SpCell List are arranged in order of gNB-DU preference, the gNB-CU can determine which of the gNB-DU's most preferred cells are also preferred by the gNB-CU based on its knowledge of radio signal conditions. For example, the gNB-CU dan determine any of the cells identified in the Potential SpCell List correspond to cells with best, optimal, and/or preferred radio signal conditions and/or measurements.

In any event, based on the order in the received Potential SpCell List and the gNB-CU's knowledge of cell radio signal conditions, the gNB-CU can select a cell from the received Potential SpCell List as a new preferred SpCell for the UE. Subsequently, the gNB-CU can send a further message (e.g., UE Context Setup Request) to the gNB-DU identifying the new preferred SpCell in the same manner as discussed above. Upon receiving the new request with this new preferred SpCell that the gNB-DU previously indicated as an acceptable alternative, the gNB-DU can admit the UE and configure this cell as the UE's SpCell. In this manner, the number of signaling iterations between gNB-CU and gNB-DU for selecting an SpCell suitable for the UE is minimized and/or reduced compared to conventional techniques.

In some embodiments, the gNB-CU can be connected to multiple gNB-CUs. In such embodiments, the gNB-CU can send a request comprising a preferred SpCell and a Candidate SpCell List (or Candidate SCell List) to each of the connected gNB-DUs. In other words, each request identifies cells associated with the particular gNB-DU to which the request is directed. The gNB-CU can select the cells to include in each request based on one or more RRC Measurement Report messages from one or more UEs, in a similar manner as described above. In these embodiments, if none of the gNB-DUs can admit a preferred SpCell and each returns a Potential SpCell List, the gNB-CU can select a new preferred SpCell from among these lists and send a further request to the particular gNB-DU associated with the new preferred SpCell.

Figure 10:
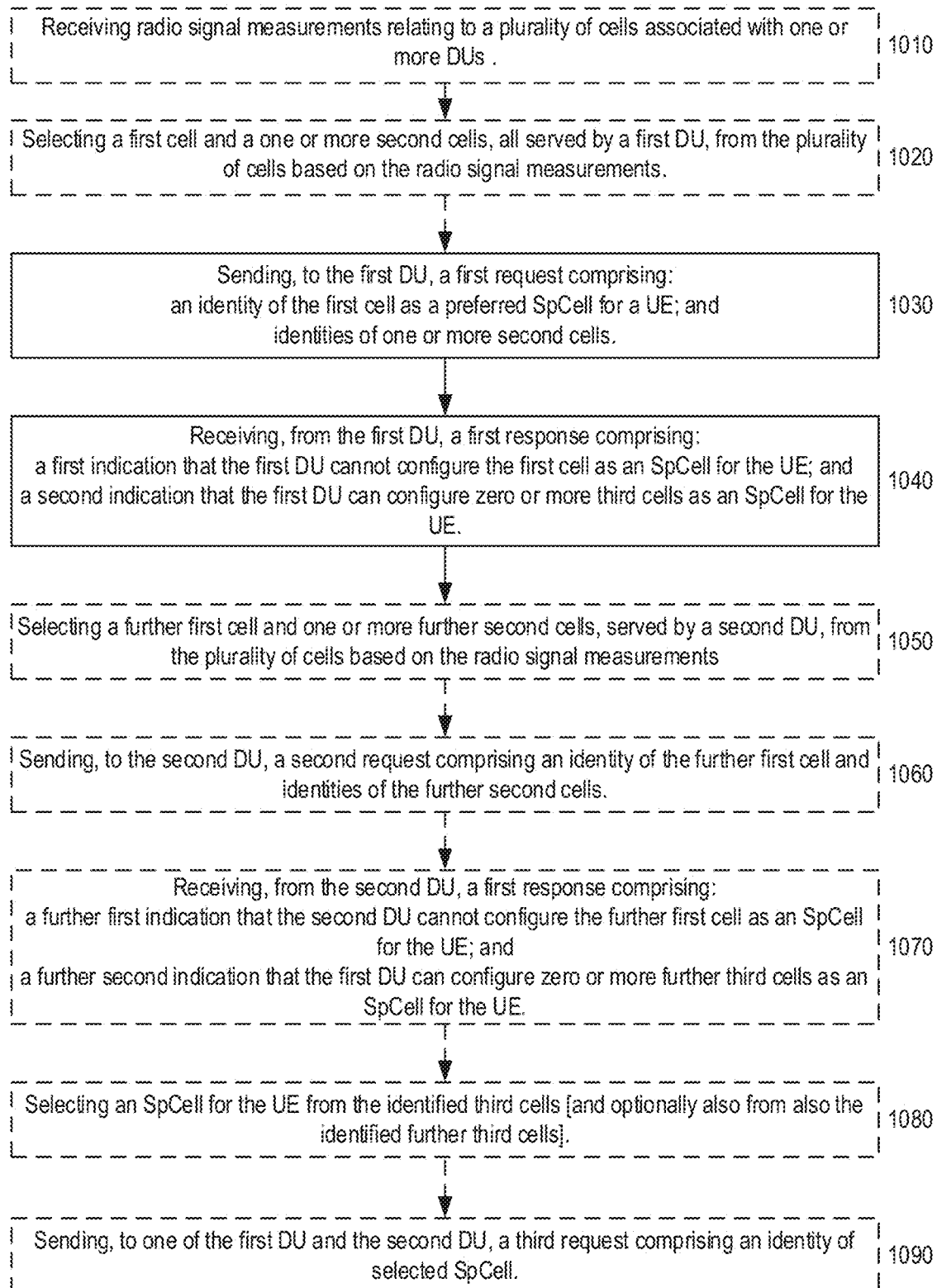
FIG. 10 is a flow diagram illustrating exemplary methods and/or procedures performed by a central unit (CU) or node of a base station (e.g., a gNB-CU), according to various exemplary embodiments of the present disclosure

FIG. 10 is a flow diagram illustrating an exemplary method and/or procedure for selecting a special cell (SpCell) to be used by a first distributed unit (DU) of the base station for serving a user equipment (UE), according to various exemplary embodiments of the present disclosure. The exemplary method and/or procedure shown in FIG. 10 can be implemented, for example, by a central unit (CU) of a base station (e.g., gNB-CU) in communication with one or more distributed units (DUs, e.g., gNB-DUs), such as shown in, or described in relation to, other figures herein. As explained below, the exemplary method and/or procedure shown in FIG. 10 can be utilized cooperatively with the exemplary method and/or procedures shown in FIG. 11 (described below), to provide various exemplary benefits described herein. Although FIG. 10 shows blocks in a particular order, this order is merely exemplary, and the operations of the exemplary method and/or procedure can be performed in a different order than shown in FIG. 10 and can be combined and/or divided into blocks having different functionality. Optional operations are represented in FIG. 10 by dashed lines.

In some embodiments, the exemplary method and/or procedure can include the operations of block 1010, in which the CU can receive radio signal measurements relating to a plurality of cells associated with one or more DUs including a first DU and, in some cases, a second DU. These can be received, for example, via one or more RRC Measurement Report messages. In some embodiments, the exemplary method and/or procedure can include the operations of block 1020, in which the CU can select, from the plurality of cells based on the radio signal measurements, a first cell as a preferred SpCell for a UE and one or more second cells as alternate SpCells for the UE. Both the first cell and the one or more second cells can be served by the first DU.

The exemplary method and/or procedure can also include the operations of block 1030, in which the CU can send, to the first DU, a first request comprising: an identity of the first cell as a preferred SpCell for the UE; and identities of the one or more second cells. In some embodiments, the one or more second cells can comprise one of the following: candidate SpCells for the UE, and candidate secondary cells (SCells) for the UE.

The exemplary method and/or procedure can also include the operations of block 1040, in which the CU can receive, from the first DU, a first response comprising: a first indication that the first DU cannot configure the first cell as an SpCell for the UE; and a second indication that the first DU can configure zero or more third cells as an SpCell for the UE. In some embodiments, the second indication comprises at least one of the following: an indication that the first DU cannot configure any of the second cells as an SpCell for the UE; and identities of the third cells, wherein each of the identified third cells is one of the second cells.

In some embodiments, the identities of the third cells are received in an ordered list, and the order of the list can be based on one or more operating conditions of the first DU. In some embodiments, the one or more operating conditions can include any of the following: first DU load conditions; availability of first DU resources associated with the respective third cells; and location of the UE within first DU coverage areas associated with the respective third cells. In some embodiments, the first response can also include a cause value indicating why the first DU cannot configure the first cell as an SpCell for the UE, and the cause value can be related to the one or more operating conditions of the first DU.

In some embodiments, the first request and the first response can comprise one of the following pairs of messages: a UE context setup request and a UE context setup failure; and a UE context modification request and a UE context modification failure.

In some embodiments, the exemplary method and/or procedure can include the operations of block 1050, in which the CU can select a further first cell and one or more further second cells, served by a second DU, from the plurality of cells based on the radio signal measurements. These embodiments can also include the operations of block 1060, in which the CU can send, to the second DU, a second request comprising an identity of the further first cell (e.g., as a preferred SpCell for the UE) and identities of the further second cells.

These embodiments can also include the operations of block 1070, in which the CU can receive, from the second DU, a second response comprising: a further first indication that the second DU cannot configure the further first cell as an SpCell for the UE; and a further second indication that the second DU can configure zero or more further third cells as an SpCell for the UE. In some embodiments, the further second indication comprises at least one of the following: an indication that the second DU cannot configure any of the further second cells as an SpCell for the UE; and identities of the further third cells, wherein each of the identified further third cells is one of the further second cells.

In some embodiments, the exemplary method and/or procedure can include the operations of block 1080, in which the CU can select an SpCell for the UE from the identified third cells (e.g., received as part of the first response in operation 1040). In some embodiments, selecting the SpCell for the UE from the third cells can be based on the list order and the received radio signal measurements. In some embodiments that include the operations with respect to the second DU (i.e., blocks 1050-1070), the selection in block 1080 can be made from a combination of the third cells identified by the first response from the first DU, and the further third cells identified by the second response from the second DU.

In some embodiments, the exemplary method and/or procedure can include the operations of block 1090, in which the CU can send, to one of the first and second DUs, a third request comprising an identity of the SpCell selected in the operations of block 1080. For example, this third request can be a UE Context Setup Request or a UE Context Modification Request, similar to the first and second requests discussed above.

Figure 11:
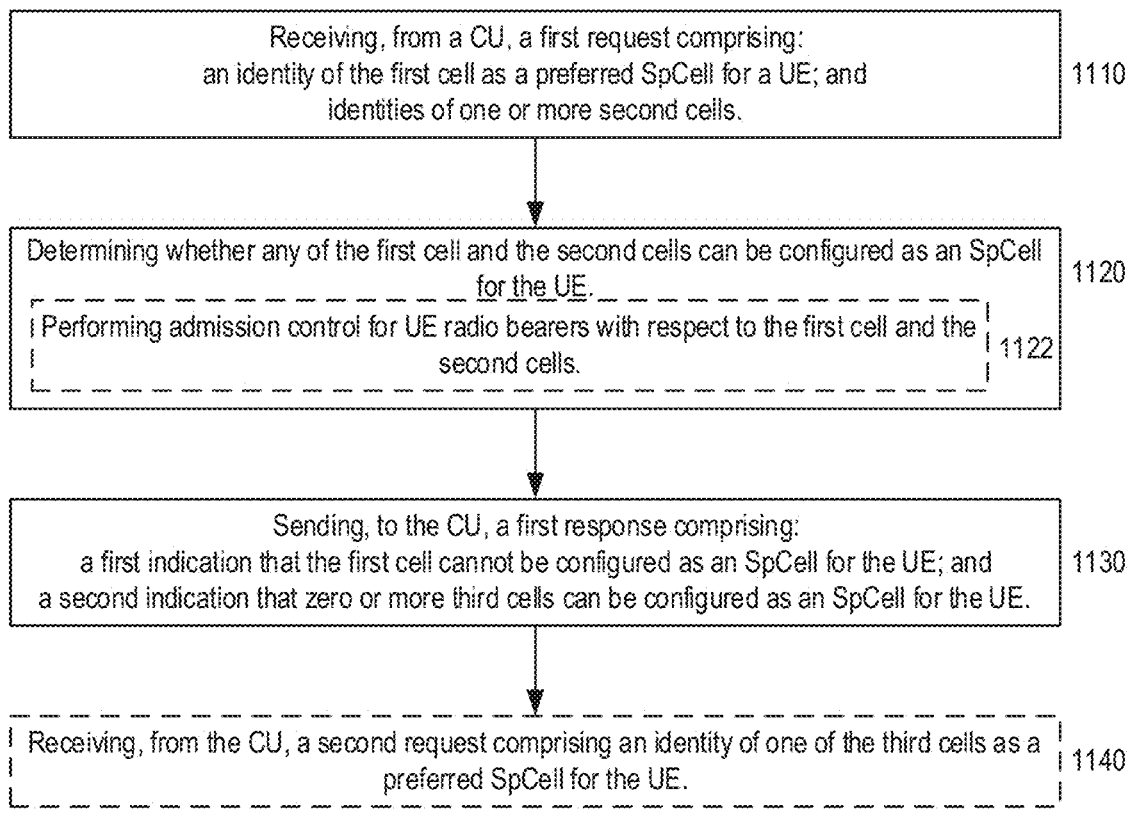
FIG. 11 is a flow diagram illustrating other exemplary methods and/or procedures performed by a distributed unit (DU) or node of a base station (e.g., gNB-DU), according to various exemplary embodiments of the present disclosure.

FIG. 11 is a flow diagram illustrating an exemplary method and/or procedure for selecting a special cell (SpCell) to be used for serving a user equipment (UE), according to various exemplary embodiments of the present disclosure. The exemplary method and/or procedure shown in FIG. 11 can be implemented, for example, by distributed unit (DU) of a base station (e.g., gNB-DU) connected to a central unit (CU) of the base station, such as shown in, or described in relation to, other figures herein. Furthermore, the exemplary method and/or procedure shown in FIG. 11 can be utilized cooperatively with the exemplary method and/or procedures shown in FIG. 10 (described above), to provide various exemplary benefits described herein. Although FIG. 11 shows blocks in a particular order, this order is merely exemplary, and the operations of the exemplary method and/or procedure can be performed in a different order than shown in FIG. 11 and can be combined and/or divided into blocks having different functionality. Optional operations are represented in FIG. 11 by dashed lines.

The exemplary method and/or procedure can include the operations of block 1110, in which the DU can receive, from the CU, a first request comprising: an identity of the first cell, served by the DU, as a preferred SpCell for the UE; and identities of the one or more second cells served by the DU.

In some embodiments, the one or more second cells can comprise one of the following: candidate SpCells for the UE, and candidate secondary cells (SCells) for the UE.

The exemplary method and/or procedure can also include the operations of block 1120, in which the DU can determine whether any of the first cell and the second cells can be configured as an SpCell for the UE. In some embodiments, the DU can make this determination based on one or more DU operating conditions, which can include one or more of the following: DU load conditions; availability of DU resources associated with the respective third cells; and location of the UE within DU coverage areas associated with the respective third cells.

In some embodiments, the first request can also include identities of one or more radio bearers, associated with the UE, to be served by an SpCell. In such embodiments, the operations of block 1122 can include the operations of sub-block 1122, in which the DU can performing admission control for the radio bearers with respect to the first cell and the second cells.

The exemplary method and/or procedure can also include the operations of block 1130, in which the DU can send, to the CU, a first response comprising: a first indication that the DU cannot configure the first cell as an SpCell for the UE; and a second indication that the DU can configure zero or more third cells as an SpCell for the UE. In some embodiments, the second indication comprises at least one of the following: an indication that the DU cannot configure any of the second cells as an SpCell for the UE; and identities of the third cells, wherein each of the identified third cells is one of the second cells. In some embodiments, the identities of the third cells can sent in an ordered list, and the order of the list can be based on the one or more DU operating conditions, discussed above. In some embodiments, the first response can also include a cause value indicating why the DU cannot configure the first cell as an SpCell for the UE, and the cause value can be related to the one or more DU operating conditions, discussed above.

In some embodiments, the first request and the first response can comprise one of the following pairs of messages: a UE context setup request and a UE context setup failure; and a UE context modification request and a UE context modification failure.

In some embodiments, the exemplary method and/or procedure can also include the operations of block 1140, in which the DU can receive, from the CU, a second request comprising an identity of one of the third cells as a preferred SpCell for the UE. For example, the third request can be a UE context setup request or a UE context modification request.

Figure 12:
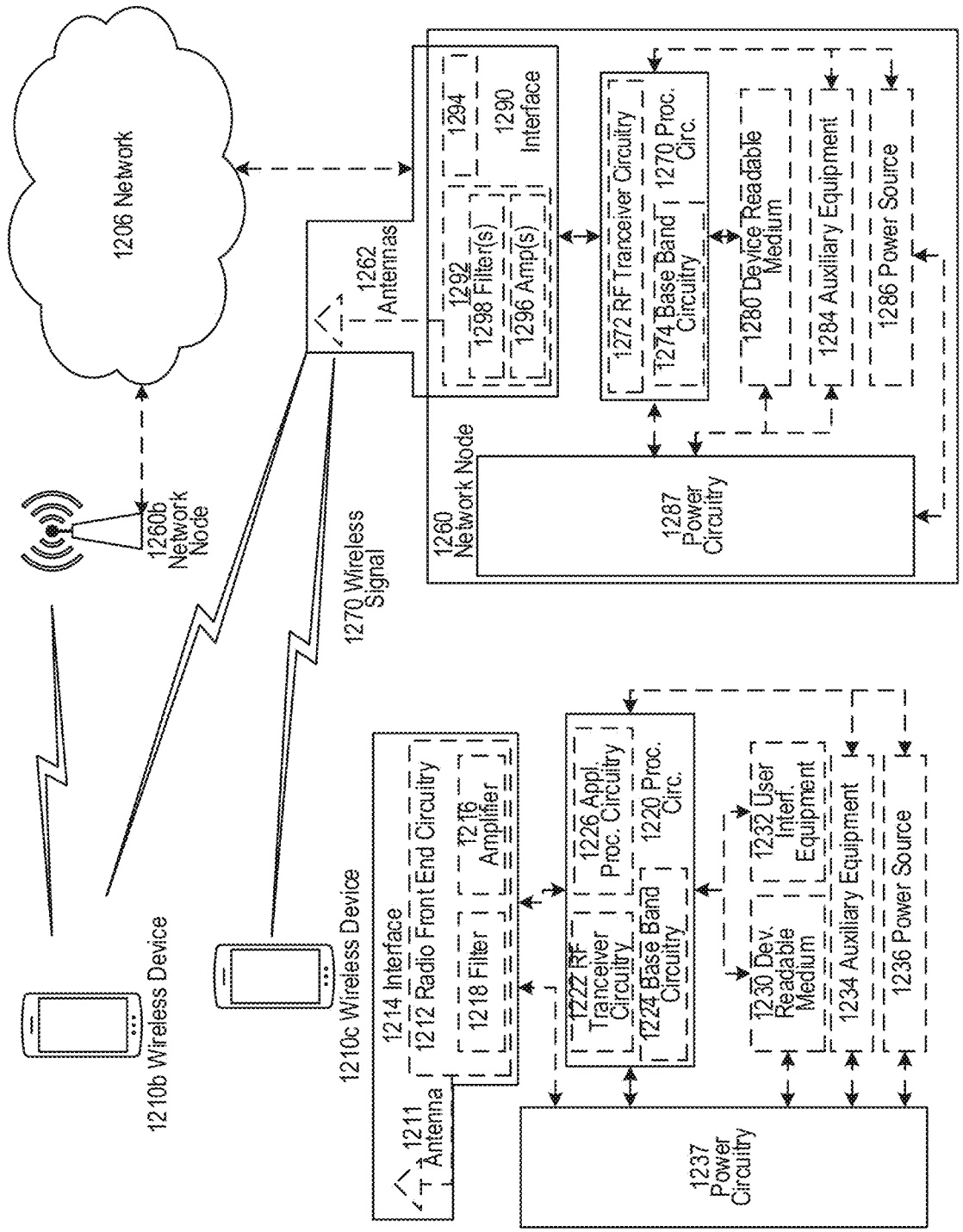
FIG. 12 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network can further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1260 are depicted as single boxes located within a larger box, or nested within multiple boxes, in practice, a network node can comprise multiple different physical components that make up a single illustrated component (e.g., device readable medium 1280 can comprise multiple separate hard drives as well as multiple RAM modules).

Similarly, network node 1260 can be composed of multiple physically separate components (e.g., a NodeB component and a RNC component, or a BTS component and a BSC component, etc.), which can each have their own respective components. In certain scenarios in which network node 1260 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1260 can be configured to support multiple radio access technologies (RATs). In such embodiments, some components can be duplicated (e.g., separate device readable medium 1280 for the different RATs) and some components can be reused (e.g., the same antenna 1262 can be shared by the RATs). Network node 1260 can also include multiple sets of the various illustrated components for different wireless technologies integrated into network node 1260, such as, for example, GSM, WCDMA, LTE, NR, WiFi, or Bluetooth wireless technologies. These wireless technologies can be integrated into the same or different chip or set of chips and other components within network node 1260.

Processing circuitry 1270 can be configured to perform any determining, calculating, or similar operations (e.g., certain obtaining operations) described herein as being provided by a network node. These operations performed by processing circuitry 1270 can include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 can execute instructions stored in device readable medium 1280 or in memory within processing circuitry 1270. Such functionality can include providing any of the various wireless features, functions, or benefits discussed herein. In some embodiments, processing circuitry 1270 can include a system on a chip (SOC).

In some embodiments, processing circuitry 1270 can include one or more of radio frequency (RF) transceiver circuitry 1272 and baseband processing circuitry 1274. In some embodiments, radio frequency (RF) transceiver circuitry 1272 and baseband processing circuitry 1274 can be on separate chips (or sets of chips), boards, or units, such as radio units and digital units. In alternative embodiments, part or all of RF transceiver circuitry 1272 and baseband processing circuitry 1274 can be on the same chip or set of chips, boards, or units In certain embodiments, some or all of the functionality described herein as being provided by a network node, base station, eNB or other such network device can be performed by processing circuitry 1270 executing instructions stored on device readable medium 1280 or memory within processing circuitry 1270. In alternative embodiments, some or all of the functionality can be provided by processing circuitry 1270 without executing instructions stored on a separate or discrete device readable medium, such as in a hard-wired manner In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1270. Device readable medium 1280 can store any suitable instructions, data or information, including a computer program, software, an application including one or more of logic, rules, code, tables, etc. and/or other instructions capable of being executed by processing circuitry 1270 and, utilized by network node 1260. Device readable medium 1280 can be used to store any calculations made by processing circuitry 1270 and/or any data received via interface 1290. In some embodiments, processing circuitry 1270 and device readable medium 1280 can be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that can be coupled to, or in certain embodiments a part of, antenna 1262. Radio front end circuitry 1292 comprises filters 1298 and amplifiers 1296. Radio front end circuitry 1292 can be connected to antenna 1262 and processing circuitry 1270. Radio front end circuitry can be configured to condition signals communicated between antenna 1262 and processing circuitry 1270. Radio front end circuitry 1292 can receive digital data that is to be sent out to other network nodes or WDs via a wireless connection. Radio front end circuitry 1292 can convert the digital data into a radio signal having the appropriate channel and bandwidth parameters using a combination of filters 1298 and/or amplifiers 1296. The radio signal can then be transmitted via antenna 1262. Similarly, when receiving data, antenna 1262 can collect radio signals which are then converted into digital data by radio front end circuitry 1292. The digital data can be passed to processing circuitry 1270. In other embodiments, the interface can comprise different components and/or different combinations of components.

In certain alternative embodiments, network node 1260 may not include separate radio front end circuitry 1292, instead, processing circuitry 1270 can comprise radio front end circuitry and can be connected to antenna 1262 without separate radio front end circuitry 1292. Similarly, in some embodiments, all or some of RF transceiver circuitry 1272 can be considered a part of interface 1290. In still other embodiments, interface 1290 can include one or more ports or terminals 1294, radio front end circuitry 1292, and RF transceiver circuitry 1272, as part of a radio unit (not shown), and interface 1290 can communicate with baseband processing circuitry 1274, which is part of a digital unit (not shown).

Antenna 1262 can include one or more antennas, or antenna arrays, configured to send and/or receive wireless signals. Antenna 1262 can be coupled to radio front end circuitry 1290 and can be any type of antenna capable of transmitting and receiving data and/or signals wirelessly. In some embodiments, antenna 1262 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1262 can be separate from network node 1260 and can be connectable to network node 1260 through an interface or port.

Antenna 1262, interface 1290, and/or processing circuitry 1270 can be configured to perform any receiving operations and/or certain obtaining operations described herein as being performed by a network node. Any information, data and/or signals can be received from a wireless device, another network node and/or any other network equipment. Similarly, antenna 1262, interface 1290, and/or processing circuitry 1270 can be configured to perform any transmitting operations described herein as being performed by a network node. Any information, data and/or signals can be transmitted to a wireless device, another network node and/or any other network equipment.

Power circuitry 1287 can comprise, or be coupled to, power management circuitry and can be configured to supply the components of network node 1260 with power for performing the functionality described herein. Power circuitry 1287 can receive power from power source 1286.

Power source 1286 and/or power circuitry 1287 can be configured to provide power to the various components of network node 1260 in a form suitable for the respective components (e.g., at a voltage and current level needed for each respective component). Power source 1286 can either be included in, or external to, power circuitry 1287 and/or network node 1260. For example, network node 1260 can be connectable to an external power source (e.g., an electricity outlet) via an input circuitry or interface such as an electrical cable, whereby the external power source supplies power to power circuitry 1287. As a further example, power source 1286 can comprise a source of power in the form of a battery or battery pack which is connected to, or integrated in, power circuitry 1287. The battery can provide backup power should the external power source fail. Other types of power sources, such as photovoltaic devices, can also be used.

Alternative embodiments of network node 1260 can include additional components beyond those shown in FIG. 12 that can be responsible for providing certain aspects of the network node's functionality, including any of the functionality described herein and/or any functionality necessary to support the subject matter described herein. For example, network node 1260 can include user interface equipment to allow and/or facilitate input of information into network node 1260 and to allow and/or facilitate output of information from network node 1260. This can allow and/or facilitate a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 can include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies can be integrated into the same or different chips or set of chips as other components within WD 1210.

Antenna 1211 can include one or more antennas or antenna arrays, configured to send and/or receive wireless signals, and is connected to interface 1214. In certain alternative embodiments, antenna 1211 can be separate from WD 1210 and be connectable to WD 1210 through an interface or port. Antenna 1211, interface 1214, and/or processing circuitry 1220 can be configured to perform any receiving or transmitting operations described herein as being performed by a WD. Any information, data and/or signals can be received from a network node and/or another WD. In some embodiments, radio front end circuitry and/or antenna 1211 can be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and can be configured to condition signals communicated between antenna 1211 and processing circuitry 1220. Radio front end circuitry 1212 can be coupled to or a part of antenna 1211. In some embodiments, WD 1210 may not include separate radio front end circuitry 1212; rather, processing circuitry 1220 can comprise radio front end circuitry and can be connected to antenna 1211. Similarly, in some embodiments, some or all of RF transceiver circuitry 1222 can be considered a part of interface 1214. Radio front end circuitry 1212 can receive digital data that is to be sent out to other network nodes or WDs via a wireless connection. Radio front end circuitry 1212 can convert the digital data into a radio signal having the appropriate channel and bandwidth parameters using a combination of filters 1218 and/or amplifiers 1216. The radio signal can then be transmitted via antenna 1211. Similarly, when receiving data, antenna 1211 can collect radio signals which are then converted into digital data by radio front end circuitry 1212. The digital data can be passed to processing circuitry 1220. In other embodiments, the interface can comprise different components and/or different combinations of components.

Processing circuitry 1220 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality can include providing any of the various wireless features or benefits discussed herein. For example, processing circuitry 1220 can execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry can comprise different components and/or different combinations of components. In certain embodiments processing circuitry 1220 of WD 1210 can comprise a SOC. In some embodiments, RF transceiver circuitry 1222, baseband processing circuitry 1224, and application processing circuitry 1226 can be on separate chips or sets of chips. In alternative embodiments, part or all of baseband processing circuitry 1224 and application processing circuitry 1226 can be combined into one chip or set of chips, and RF transceiver circuitry 1222 can be on a separate chip or set of chips. In still alternative embodiments, part or all of RF transceiver circuitry 1222 and baseband processing circuitry 1224 can be on the same chip or set of chips, and application processing circuitry 1226 can be on a separate chip or set of chips. In yet other alternative embodiments, part or all of RF transceiver circuitry 1222, baseband processing circuitry 1224, and application processing circuitry 1226 can be combined in the same chip or set of chips. In some embodiments, RF transceiver circuitry 1222 can be a part of interface 1214. RF transceiver circuitry 1222 can condition RF signals for processing circuitry 1220.

In certain embodiments, some or all of the functionality described herein as being performed by a WD can be provided by processing circuitry 1220 executing instructions stored on device readable medium 1230, which in certain embodiments can be a computer-readable storage medium. In alternative embodiments, some or all of the functionality can be provided by processing circuitry 1220 without executing instructions stored on a separate or discrete device readable storage medium, such as in a hard-wired manner In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 can be configured to perform any determining, calculating, or similar operations (e.g., certain obtaining operations) described herein as being performed by a WD. These operations, as performed by processing circuitry 1220, can include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 can be operable to store a computer program, software, an application including one or more of logic, rules, code, tables, etc. and/or other instructions capable of being executed by processing circuitry 1220. Device readable medium 1230 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1220. In some embodiments, processing circuitry 1220 and device readable medium 1230 can be considered to be integrated.

User interface equipment 1232 can include components that allow and/or facilitate a human user to interact with WD 1210. Such interaction can be of many forms, such as visual, audial, tactile, etc. User interface equipment 1232 can be operable to produce output to the user and to allow and/or facilitate the user to provide input to WD 1210. The type of interaction can vary depending on the type of user interface equipment 1232 installed in WD 1210. For example, if WD 1210 is a smart phone, the interaction can be via a touch screen; if WD 1210 is a smart meter, the interaction can be through a screen that provides usage (e.g., the number of gallons used) or a speaker that provides an audible alert (e.g., if smoke is detected). User interface equipment 1232 can include input interfaces, devices and circuits, and output interfaces, devices and circuits. User interface equipment 1232 can be configured to allow and/or facilitate input of information into WD 1210, and is connected to processing circuitry 1220 to allow and/or facilitate processing circuitry 1220 to process the input information. User interface equipment 1232 can include, for example, a microphone, a proximity or other sensor, keys/buttons, a touch display, one or more cameras, a USB port, or other input circuitry. User interface equipment 1232 is also configured to allow and/or facilitate output of information from WD 1210, and to allow and/or facilitate processing circuitry 1220 to output information from WD 1210. User interface equipment 1232 can include, for example, a speaker, a display, vibrating circuitry, a USB port, a headphone interface, or other output circuitry. Using one or more input and output interfaces, devices, and circuits, of user interface equipment 1232, WD 1210 can communicate with end users and/or the wireless network, and allow and/or facilitate them to benefit from the functionality described herein.

Auxiliary equipment 1234 is operable to provide more specific functionality which may not be generally performed by WDs. This can comprise specialized sensors for doing measurements for various purposes, interfaces for additional types of communication such as wired communications etc. The inclusion and type of components of auxiliary equipment 1234 can vary depending on the embodiment and/or scenario.

Power source 1236 can, in some embodiments, be in the form of a battery or battery pack. Other types of power sources, such as an external power source (e.g., an electricity outlet), photovoltaic devices or power cells, can also be used. WD 1210 can further comprise power circuitry 1237 for delivering power from power source 1236 to the various parts of WD 1210 which need power from power source 1236 to carry out any functionality described or indicated herein. Power circuitry 1237 can in certain embodiments comprise power management circuitry. Power circuitry 1237 can additionally or alternatively be operable to receive power from an external power source; in which case WD 1210 can be connectable to the external power source (such as an electricity outlet) via input circuitry or an interface such as an electrical power cable. Power circuitry 1237 can also in certain embodiments be operable to deliver power from an external power source to power source 1236. This can be, for example, for the charging of power source 1236. Power circuitry 1237 can perform any converting or other modification to the power from power source 1236 to make it suitable for supply to the respective components of WD 1210.

Figure 13:
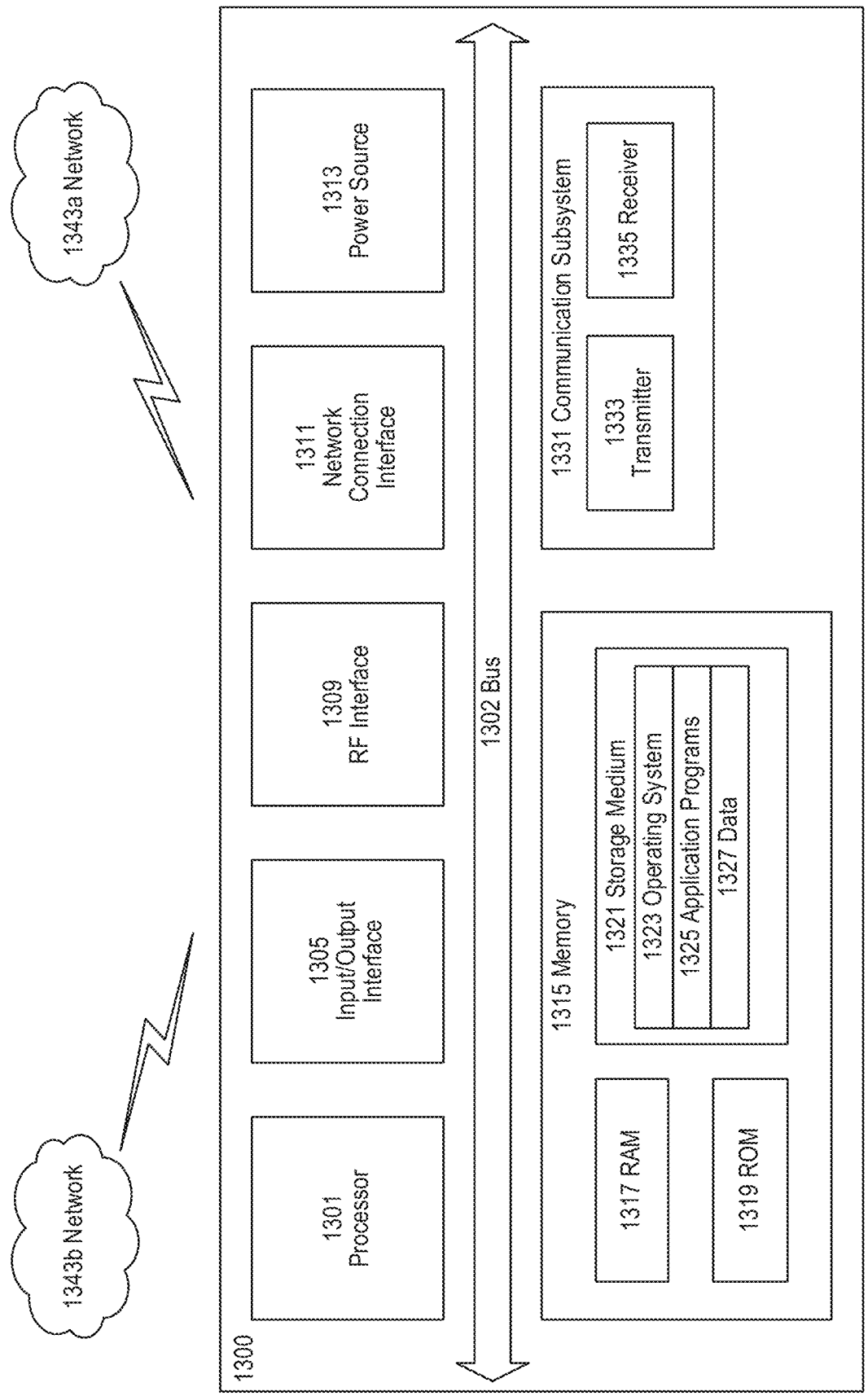
FIG. 13 illustrates an exemplary embodiment of a UE, in accordance with various aspects described herein.

FIG. 13 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 13200 can be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 can include other similar types of information. Certain UEs can utilize all of the components shown in FIG. 13, or only a subset of the components. The level of integration between the components can vary from one UE to another UE. Further, certain UEs can contain multiple instances of a component, such as multiple processors, memories, transceivers, transmitters, receivers, etc.

In FIG. 13, processing circuitry 1301 can be configured to process computer instructions and data. Processing circuitry 1301 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 can include two central processing units (CPUs). Data can be information in a form suitable for use by a computer.

In the depicted embodiment, input/output interface 1305 can be configured to provide a communication interface to an input device, output device, or input and output device. UE 1300 can be configured to use an output device via input/output interface 1305. An output device can use the same type of interface port as an input device. For example, a USB port can be used to provide input to and output from UE 1300. The output device can be a speaker, a sound card, a video card, a display, a monitor, a printer, an actuator, an emitter, a smartcard, another output device, or any combination thereof. UE 1300 can be configured to use an input device via input/output interface 1305 to allow and/or facilitate a user to capture information into UE 1300. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 13, RF interface 1309 can be configured to provide a communication interface to RF components such as a transmitter, a receiver, and an antenna. Network connection interface 1311 can be configured to provide a communication interface to network 1343a. Network 1343a can encompass wired and/or wireless networks such as a local-area network (LAN), a wide-area network (WAN), a computer network, a wireless network, a telecommunications network, another like network or any combination thereof. For example, network 1343a can comprise a Wi-Fi network. Network connection interface 1311 can be configured to include a receiver and a transmitter interface used to communicate with one or more other devices over a communication network according to one or more communication protocols, such as Ethernet, TCP/IP, SONET, ATM, or the like. Network connection interface 1311 can implement receiver and transmitter functionality appropriate to the communication network links (e.g., optical, electrical, and the like). The transmitter and receiver functions can share circuit components, software or firmware, or alternatively can be implemented separately.

RAM 1317 can be configured to interface via bus 1302 to processing circuitry 1301 to provide storage or caching of data or computer instructions during the execution of software programs such as the operating system, application programs, and device drivers. ROM 1319 can be configured to provide computer instructions or data to processing circuitry 1301. For example, ROM 1319 can be configured to store invariant low-level system code or data for basic system functions such as basic input and output (I/O), startup, or reception of keystrokes from a keyboard that are stored in a non-volatile memory. Storage medium 1321 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 can be configured to include operating system 1323, application program 1325 such as a web browser application, a widget or gadget engine or another application, and data file 1327. Storage medium 1321 can store, for use by UE 1300, any of a variety of various operating systems or combinations of operating systems.

Storage medium 1321 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 can allow and/or facilitate UE 1300 to access computer-executable instructions, application programs or the like, stored on transitory or non-transitory memory media, to off-load data, or to upload data. An article of manufacture, such as one utilizing a communication system can be tangibly embodied in storage medium 1321, which can comprise a device readable medium.

In FIG. 13, processing circuitry 1301 can be configured to communicate with network 1343*b* using communication subsystem 1331. Network 1343*a* and network 1343*b* can be the same network or networks or different network or networks. Communication subsystem 1331 can be configured to include one or more transceivers used to communicate with network 1343*b*. For example, communication subsystem 1331 can be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver can include transmitter 1333 and/or receiver 1335 to implement transmitter or receiver functionality, respectively, appropriate to the RAN links (e.g., frequency allocations and the like). Further, transmitter 1333 and receiver 1335 of each transceiver can share circuit components, software or firmware, or alternatively can be implemented separately.

In the illustrated embodiment, the communication functions of communication subsystem 1331 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 can include cellular communication, Wi-Fi communication, Bluetooth communication, and GPS communication. Network 1343*b* can encompass wired and/or wireless networks such as a local-area network (LAN), a wide-area network (WAN), a computer network, a wireless network, a telecommunications network, another like network or any combination thereof. For example, network 1343*b* can be a cellular network, a Wi-Fi network, and/or a near-field network. Power source 1313 can be configured to provide alternating current (AC) or direct current (DC) power to components of UE 1300.

The features, benefits and/or functions described herein can be implemented in one of the components of UE 1300 or partitioned across multiple components of UE 1300. Further, the features, benefits, and/or functions described herein can be implemented in any combination of hardware, software or firmware. In one example, communication subsystem 1331 can be configured to include any of the components described herein. Further, processing circuitry 1301 can be configured to communicate with any of such components over bus 1302. In another example, any of such components can be represented by program instructions stored in memory that when executed by processing circuitry 1301 perform the corresponding functions described herein. In another example, the functionality of any of such components can be partitioned between processing circuitry 1301 and communication subsystem 1331. In another example, the non-computationally intensive functions of any of such components can be implemented in software or firmware and the computationally intensive functions can be implemented in hardware.

Figure 14:
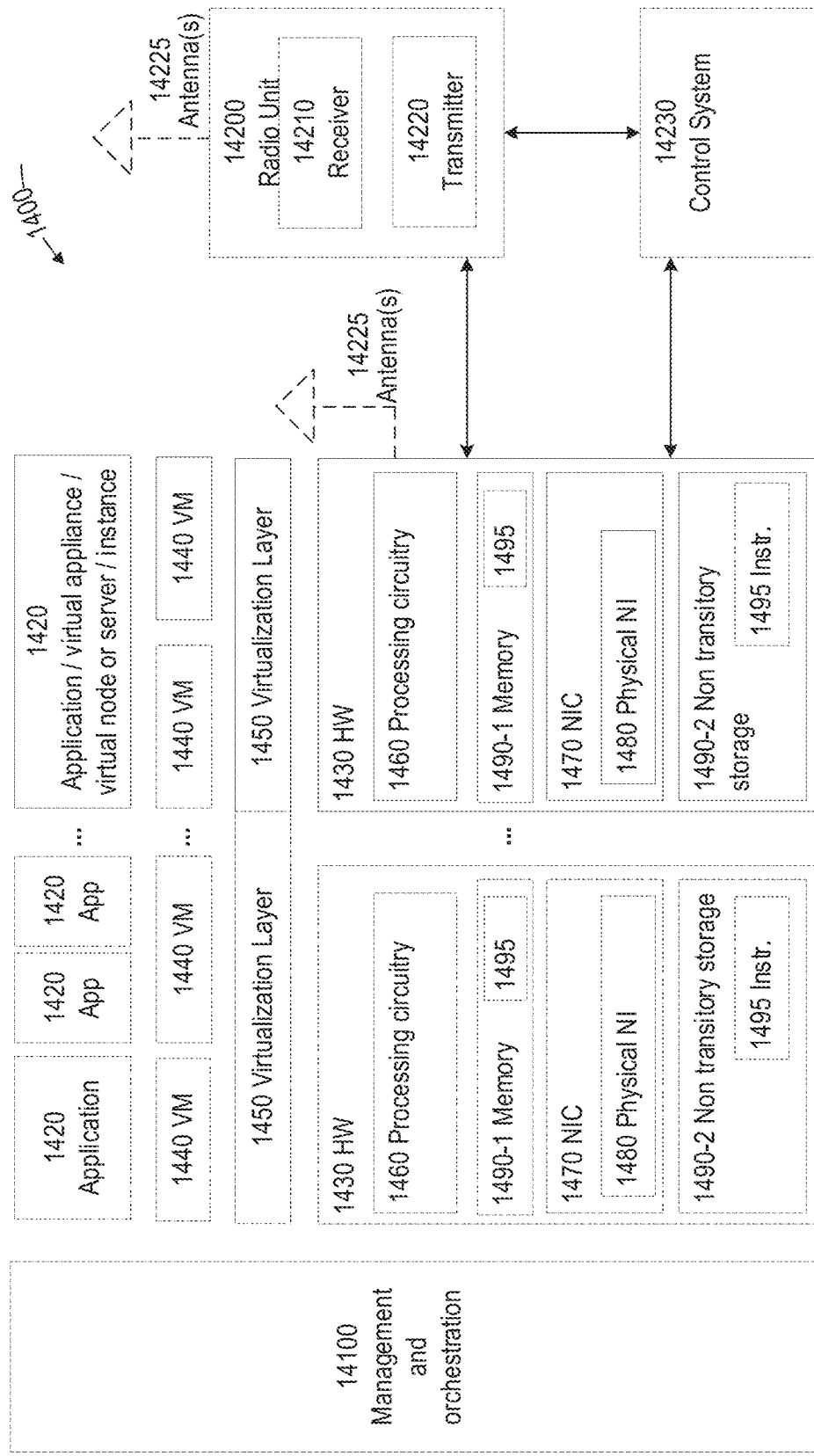
FIG. 14 is a block diagram illustrating an exemplary virtualization environment usable for implementation of various embodiments of network nodes described herein.

FIG. 14 is a schematic block diagram illustrating a virtualization environment 1400 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node can be entirely virtualized.

The functions can be implemented by one or more applications 1420 (which can alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which can be commercial off-the-shelf (COTS) processors, dedicated Application Specific Integrated Circuits (ASICs), or any other type of processing circuitry including digital or analog hardware components or special purpose processors. Each hardware device can comprise memory 1490-1 which can be non-persistent memory for temporarily storing instructions 1495 or software executed by processing circuitry 1460. Each hardware device can comprise one or more network interface controllers (NICs) 1470, also known as network interface cards, which include physical network interface 1480. Each hardware device can also include non-transitory, persistent, machine-readable storage media 1490-2 having stored therein software 1495 and/or instructions executable by processing circuitry 1460. Software 1495 can include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and can be run by a corresponding virtualization layer 1450 or hypervisor. Different embodiments of the instance of virtual appliance 1420 can be implemented on one or more of virtual machines 1440, and the implementations can be made in different ways.

During operation, processing circuitry 1460 executes software 1495 to instantiate the hypervisor or virtualization layer 1450, which can sometimes be referred to as a virtual machine monitor (VMM). Virtualization layer 1450 can present a virtual operating platform that appears like networking hardware to virtual machine 1440.

As shown in FIG. 14, hardware 1430 can be a standalone network node with generic or specific components. Hardware 1430 can comprise antenna 14225 and can implement some functions via virtualization. Alternatively, hardware 1430 can be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1440 can be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 can be coupled to one or more antennas 14225. Radio units 14200 can communicate directly with hardware nodes 1430 via one or more appropriate network interfaces and can be used in combination with the virtual components to provide a virtual node with radio capabilities, such as a radio access node or a base station.

In some embodiments, some signalling can be effected with the use of control system 14230 which can alternatively be used for communication between the hardware nodes 1430 and radio units 14200.

Figure 15:
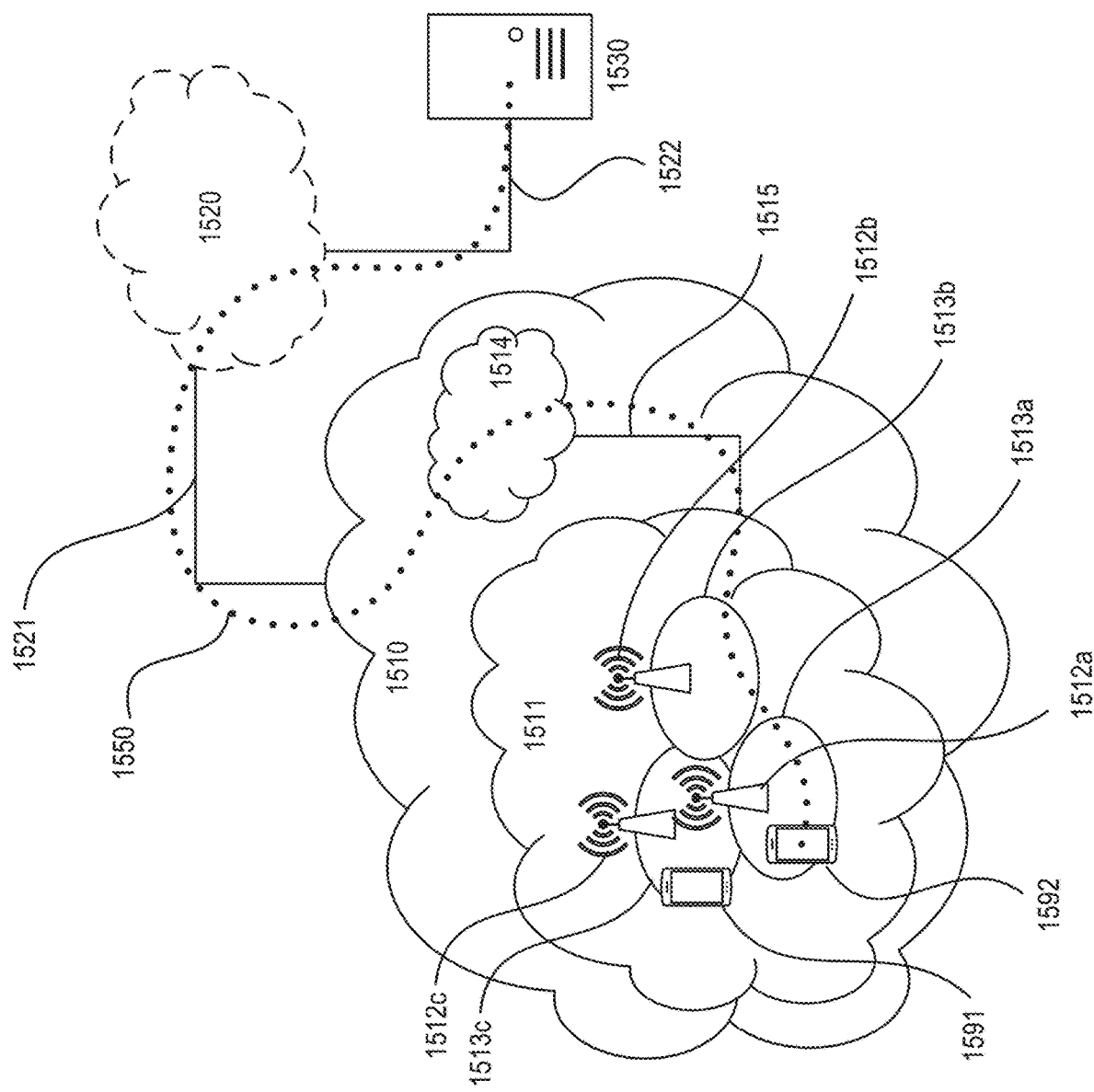
FIGS. 15-16 are block diagrams of various exemplary communication systems and/or networks, in accordance with various aspects described herein.

With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c can be configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station.

Telecommunication network 1510 is itself connected to host computer 1530, which can be embodied in the hardware and/or software of a standalone server, a cloud-implemented server, a distributed server or as processing resources in a server farm. Host computer 1530 can be under the ownership or control of a service provider, or can be operated by the service provider or on behalf of the service provider. Connections 1521 and 1522 between telecommunication network 1510 and host computer 1530 can extend directly from core network 1514 to host computer 1530 or can go via an optional intermediate network 1520. Intermediate network 1520 can be one of, or a combination of more than one of, a public, private or hosted network; intermediate network 1520, if any, can be a backbone network or the Internet; in particular, intermediate network 1520 can comprise two or more sub-networks (not shown).

The communication system of FIG. 15 as a whole enables connectivity between the connected UEs 1591, 1592 and host computer 1530. The connectivity can be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 can be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which can have storage and/or processing capabilities. In particular, processing circuitry 1618 can comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 can be operable to provide a service to a remote user, such as UE 1630 connecting via OTT connection 1650 terminating at UE 1630 and host computer 1610. In providing the service to the remote user, host application 1612 can provide user data which is transmitted using OTT connection 1650.

Communication system 1600 can also include base station 1620 provided in a telecommunication system and comprising hardware 1625 enabling it to communicate with host computer 1610 and with UE 1630. Hardware 1625 can include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 can be configured to facilitate connection 1660 to host computer 1610. Connection 1660 can be direct or it can pass through a core network (not shown in FIG. 16) of the telecommunication system and/or through one or more intermediate networks outside the telecommunication system. In the embodiment shown, hardware 1625 of base station 1620 can also include processing circuitry 1628, which can comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 can also include UE 1630 already referred to. Its hardware 1635 can include radio interface 1637 configured to set up and maintain wireless connection 1670 with a base station serving a coverage area in which UE 1630 is currently located. Hardware 1635 of UE 1630 can also include processing circuitry 1638, which can comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 can be operable to provide a service to a human or non-human user via UE 1630, with the support of host computer 1610. In host computer 1610, an executing host application 1612 can communicate with the executing client application 1632 via OTT connection 1650 terminating at UE 1630 and host computer 1610. In providing the service to the user, client application 1632 can receive request data from host application 1612 and provide user data in response to the request data. OTT connection 1650 can transfer both the request data and the user data. Client application 1632 can interact with the user to generate the user data that it provides.

Figure 16:
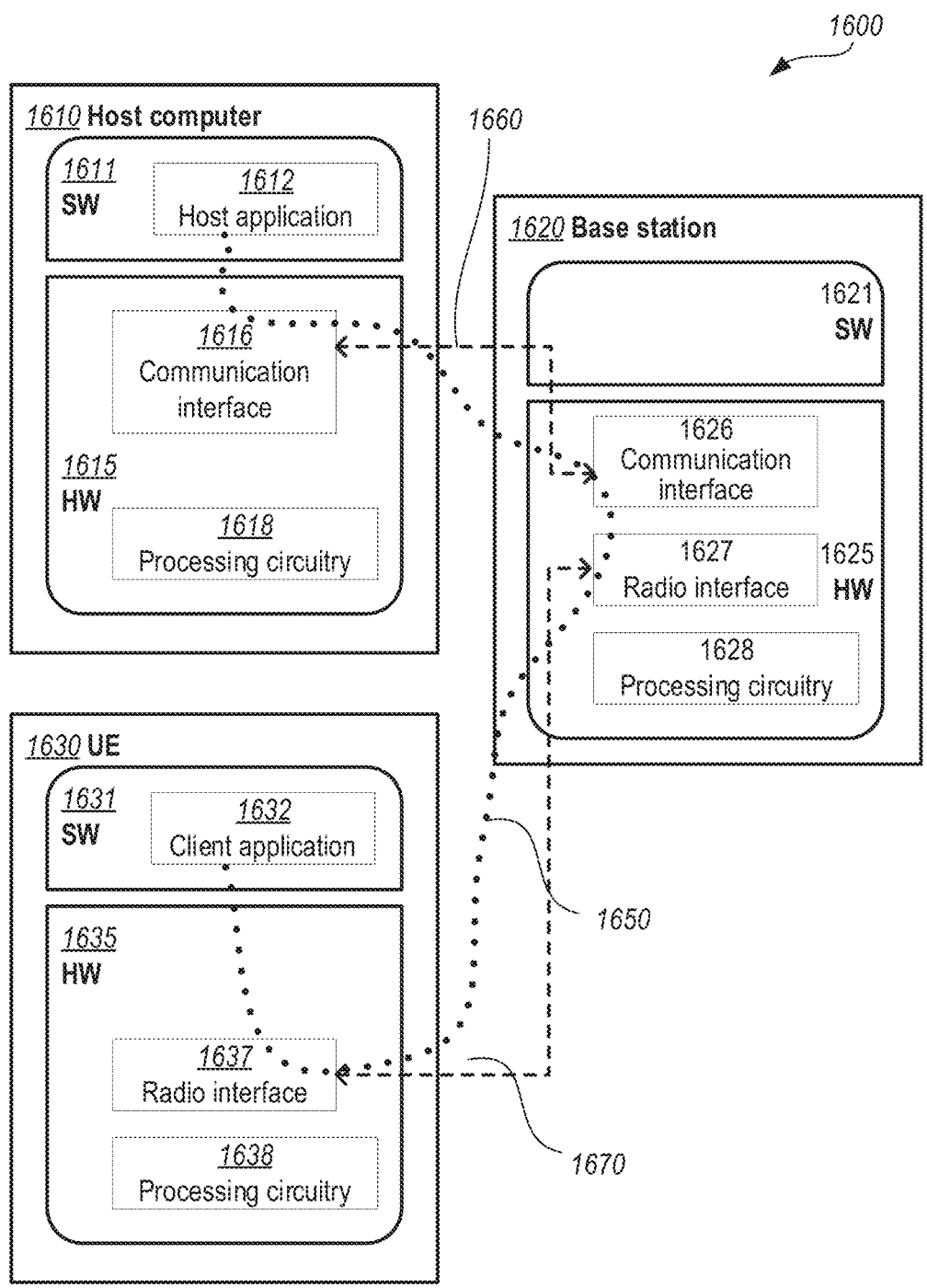

It is noted that host computer 1610, base station 1620 and UE 1630 illustrated in FIG. 16 can be similar or identical to host computer 1530, one of base stations 1512a, 1512b, 1512c and one of UEs 1591, 1592 of FIG. 15, respectively. This is to say, the inner workings of these entities can be as shown in FIG. 16 and independently, the surrounding network topology can be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure can determine the routing, which it can be configured to hide from UE 1630 or from the service provider operating host computer 1610, or both. While OTT connection 1650 is active, the network infrastructure can further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1650 between host computer 1610 and UE 1630, in response to variations in the measurement results. The measurement procedure and/or the network functionality for reconfiguring OTT connection 1650 can be implemented in software 1611 and hardware 1615 of host computer 1610 or in software 1631 and hardware 1635 of UE 1630, or both. In embodiments, sensors (not shown) can be deployed in or in association with communication devices through which OTT connection 1650 passes; the sensors can participate in the measurement procedure by supplying values of the monitored quantities exemplified above, or supplying values of other physical quantities from which software 1611, 1631 can compute or estimate the monitored quantities. The reconfiguring of OTT connection 1650 can include message format, retransmission settings, preferred routing etc.; the reconfiguring need not affect base station 1620, and it can be unknown or imperceptible to base station 1620. Such procedures and functionalities can be known and practiced in the art. In certain embodiments, measurements can involve proprietary UE signaling facilitating host computer 1610's measurements of throughput, propagation times, latency and the like. The measurements can be implemented in that software 1611 and 1631 causes messages to be transmitted, in particular empty or 'dummy' messages, using OTT connection 1650 while it monitors propagation times, errors etc.

FIG. 17 is a flowchart illustrating an exemplary method and/or procedure implemented in a communication system, in accordance with one embodiment. The communication system includes a host computer, a base station and a UE which, in some exemplary embodiments, can be those described with reference to FIGS. 15 and 16. For simplicity of the present disclosure, only drawing references to FIG. 17 will be included in this section. In step 1710, the host computer provides user data. In substep 1711 (which can be optional) of step 1710, the host computer provides the user data by executing a host application. In step 1720, the host computer initiates a transmission carrying the user data to the UE. In step 1730 (which can be optional), the base station transmits to the UE the user data which was carried in the transmission that the host computer initiated, in accordance with the teachings of the embodiments described throughout this disclosure. In step 1740 (which can also be optional), the UE executes a client application associated with the host application executed by the host computer.

FIG. 18 is a flowchart illustrating an exemplary method and/or procedure implemented in a communication system, in accordance with one embodiment. The communication system includes a host computer, a base station and a UE which can be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission can pass via the base station, in accordance with the teachings of the embodiments described throughout this disclosure. In step 1830 (which can be optional), the UE receives the user data carried in the transmission.

FIG. 19 is a flowchart illustrating an exemplary method and/or procedure implemented in a communication system, in accordance with one embodiment. The communication system includes a host computer, a base station and a UE which can be those described with reference to FIGS. 15 and 16. For simplicity of the present disclosure, only drawing references to FIG. 19 will be included in this section. In step 1910 (which can be optional), the UE receives input data provided by the host computer. Additionally or alternatively, in step 1920, the UE provides user data. In substep 1921 (which can be optional) of step 1920, the UE provides the user data by executing a client application. In substep 1911 (which can be optional) of step 1910, the UE executes a client application which provides the user data in reaction to the received input data provided by the host computer. In providing the user data, the executed client application can further consider user input received from the user. Regardless of the specific manner in which the user data was provided, the UE initiates, in substep 1930 (which can be optional), transmission of the user data to the host computer. In step 1940 of the method, the host computer receives the user data transmitted from the UE, in accordance with the teachings of the embodiments described throughout this disclosure.

FIG. 20 is a flowchart illustrating an exemplary method and/or procedure implemented in a communication system, in accordance with one embodiment. The communication system includes a host computer, a base station and a UE which can be those described with reference to FIGS. 15 and 16. For simplicity of the present disclosure, only drawing references to FIG. 20 will be included in this section. In step 2010 (which can be optional), in accordance with the teachings of the embodiments described throughout this disclosure, the base station receives user data from the UE. In step 2020 (which can be optional), the base station initiates transmission of the received user data to the host computer. In step 2030 (which can be optional), the host computer receives the user data carried in the transmission initiated by the base station.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method, performed by a central unit (CU) of a base station, for selecting a special cell (SpCell) to be used by a first distributed unit (DU) of the base station for serving a user equipment (UE) the method comprising:
   sending, to the first DU, a first request comprising:
      an identity of a first cell served by the first DU, as a preferred SpCell for the UE; and
      identities of one or more second cells served by the first DU, as candidate SpCells for the UE; and
   receiving, from the first DU, a first response comprising:
      a first indication that the first DU cannot configure the first cell as an SpCell for the UE; and
      a second indication of which of the second cells that the first DU can configure as an SpCell for the UE.

2. The method of claim 1, further comprising:
   receiving radio signal measurements relating to a plurality of cells associated with one or more DUs including the first DU; and
   selecting the first cell and the one or more second cells from the plurality of cells based on the radio signal measurements.

3. The method of claim 2, further comprising:
   selecting a further first cell and one or more further second cells, served by a second DU, from the plurality of cells based on the radio signal measurements;
   sending, to the second DU, a second request comprising an identity of the further first cell and identities of the further second cells;
   receiving, from the second DU, a second response comprising:
      a further first indication that the second DU cannot configure the further first cell as an SpCell for the UE; and
      a further second indication of which of the further second cells that the second DU can configure as an SpCell for the UE.

4. The method of claim 3, wherein the further second indication comprises:
   when the second DU cannot configure any of the further second cells as an SpCell for the UE, an indication that the second DU cannot configure any of the further second cells as an SpCell for the UE; and
   when the second DU can configure at least one of the further second cells as an SpCell for the UE, identities of the further second cells that the second DU can configure as an SpCell for the UE.

5. The method of claim 4, further comprising selecting an SpCell for the UE from a combination of the following: the second cells identified by the first response and the further second cells identified by the second response.

6. The method of claim 1, wherein the second indication comprises:
   when the first DU cannot configure any of the second cells as an SpCell for the UE, an indication that the first DU cannot configure any of the second cells as an SpCell for the UE; and
   when the first DU can configure at least one of the second cells as an SpCell for the UE, identities of the second cells that the first DU can configure as an SpCell for the UE.

7. The method of claim 6, further comprising selecting an SpCell for the UE from the second cells identified by the second indication.

8. The method of claim 6, wherein:
the identities of the second cells are received in an ordered list; and
the order of the list is based on one or more operating conditions of the first DU.

9. The method of claim 8, wherein the one or more operating conditions comprise one or more of:
first DU load conditions;
availability of first DU resources associated with the respective second cells; or
location of the UE within first DU coverage areas associated with the respective second cells.

10. The method of claim 8, wherein:
the first response also includes a cause value indicating why the first DU cannot configure the first cell as an SpCell for the UE; and
the cause value is related to the one or more operating conditions of the first DU.

11. The method of claim 8, wherein selecting the SpCell for the UE from the second cells is based on the list order and radio signal measurements relating to a plurality of cells associated with one or more DUs including the first DU.

12. The method of claim 1, wherein the one or more second cells comprise one of the following: candidate SpCells for the UE, and candidate secondary cells (SCells) for the UE.

13. The method of claim 1, wherein the first request and the first response comprise one of the following pairs of messages:
a UE context setup request and a UE context setup failure; and
a UE context modification request and a UE context modification failure.

14. A central unit (CU) of a base station, configured to select a special cell (SpCell) to be used by a first distributed unit (DU) of the base station for serving a user equipment (UE), the CU comprising:
a non-transitory memory storing computer-executable instructions; and
processing circuitry coupled to the non-transitory memory and configured to execute the stored instructions, wherein execution of the stored instructions causes the CU to:
send, to the first DU, a first request comprising:
an identity of a first cell served by the first DU, as a preferred SpCell for the UE; and
identities of one or more second cells served by the first DU, as candidate SpCells for the UE; and
receive, from the first DU, a first response comprising:
a first indication that the first DU cannot configure the first cell as an SpCell for the UE; and
a second indication of which of the second cells that the first DU can configure as an SpCell for the UE.

15. The CU of claim 14, wherein the second indication comprises:
when the first DU cannot configure any of the second cells as an SpCell for the UE, an indication that the first DU cannot configure any of the second cells as an SpCell for the UE; and
when the first DU can configure at least one of the second cells as an SpCell for the UE, identities of the second cells that the first DU can configure as an SpCell for the UE.

16. The CU of claim 15, wherein:
the identities of the second cells are received in an ordered list; and
the order of the list is based on one or more operating conditions of the first DU.

17. The CU of claim 16, wherein:
the first response also includes a cause value indicating why the first DU cannot configure the first cell as an SpCell for the UE; and
the cause value is related to the one or more operating conditions of the first DU.

18. The CU of claim 14, wherein the first request and the first response comprise one of the following pairs of messages:
a UE context setup request and a UE context setup failure; and
a UE context modification request and a UE context modification failure.

19. A non-transitory computer-readable medium storing computer-executable instructions that, when executed by processing circuitry comprising a central unit (CU) of a base station, configure the CU to:
send, to a first distributed unit (DU), a first request comprising:
an identity of a first cell served by the first DU, as a preferred special cell (SpCell) for the UE; and
identities of one or more second cells served by the first DU, as candidate SpCells for the UE; and
receive, from the first DU, a first response comprising:
a first indication that the first DU cannot configure the first cell as an SpCell for the UE; and
a second indication of which of the second cells that the first DU can configure as an SpCell for the UE.

* * * * *